(12) United States Patent
Sato

(10) Patent No.: US 8,903,987 B2
(45) Date of Patent: Dec. 2, 2014

(54) COMMUNICATION APPARATUS AND METHOD FOR CONTROLLING COMMUNICATION APPARATUS

(75) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1202 days.

(21) Appl. No.: 12/756,045

(22) Filed: Apr. 7, 2010

(65) Prior Publication Data

US 2010/0293271 A1  Nov. 18, 2010

(30) Foreign Application Priority Data

May 15, 2009 (JP) ................. 2009-118969

(51) Int. Cl.
*G06F 15/173* (2006.01)
*H04L 29/06* (2006.01)

(52) U.S. Cl.
CPC .............. *H04L 69/24* (2013.01); *H04L 67/38* (2013.01)
USPC ............ 709/224; 709/220; 463/39; 455/418; 455/41.2; 370/395.1

(58) Field of Classification Search
CPC .. H04L 29/08306; H04L 67/104; H04L 67/12
USPC ......................................................... 709/224
See application file for complete search history.

(56) References Cited

U.S. PATENT DOCUMENTS

| | | | |
|---|---|---|---|
| 2005/0198222 A1 | 9/2005 | Kohinata | |
| 2005/0272504 A1* | 12/2005 | Eguchi et al. | 463/40 |
| 2007/0141984 A1 | 6/2007 | Kuehnel | |
| 2007/0197287 A1* | 8/2007 | Shimizu | 463/31 |
| 2008/0119273 A1* | 5/2008 | Yamada et al. | 463/39 |
| 2009/0029691 A1 | 1/2009 | Shen | |

FOREIGN PATENT DOCUMENTS

| | | |
|---|---|---|
| JP | 2005-182481 A | 7/2005 |
| JP | 2006-246057 A | 9/2006 |
| JP | 2007-151194 A | 6/2007 |
| JP | 2009-518059 A | 5/2009 |
| WO | 2006/088016 A | 8/2006 |
| WO | 2008103103 A2 | 8/2008 |

OTHER PUBLICATIONS

Google Patent Prior art seach.*
Google Patent Search.*
Sud et al, "Enabling Rapid Wireless System Composition through Layer-2 Discovery," IEEE Network, Jul. 1, 2008, p. 14-20.

* cited by examiner

*Primary Examiner* — Arvin Eskandarnia
(74) *Attorney, Agent, or Firm* — Canon USA, Inc., IP Division

(57) ABSTRACT

A first communication apparatus for use in a network established by a plurality of communication apparatuses to implement a predetermined system function includes a sending unit configured to send, to the network, information on an apparatus function for implementing the predetermined system function to accommodate a communication apparatus having the apparatus function in the network, and an execution unit configured to execute processing for accommodating a second communication apparatus having the apparatus function sent by the sending unit in the network according to a request from the second communication apparatus.

24 Claims, 14 Drawing Sheets

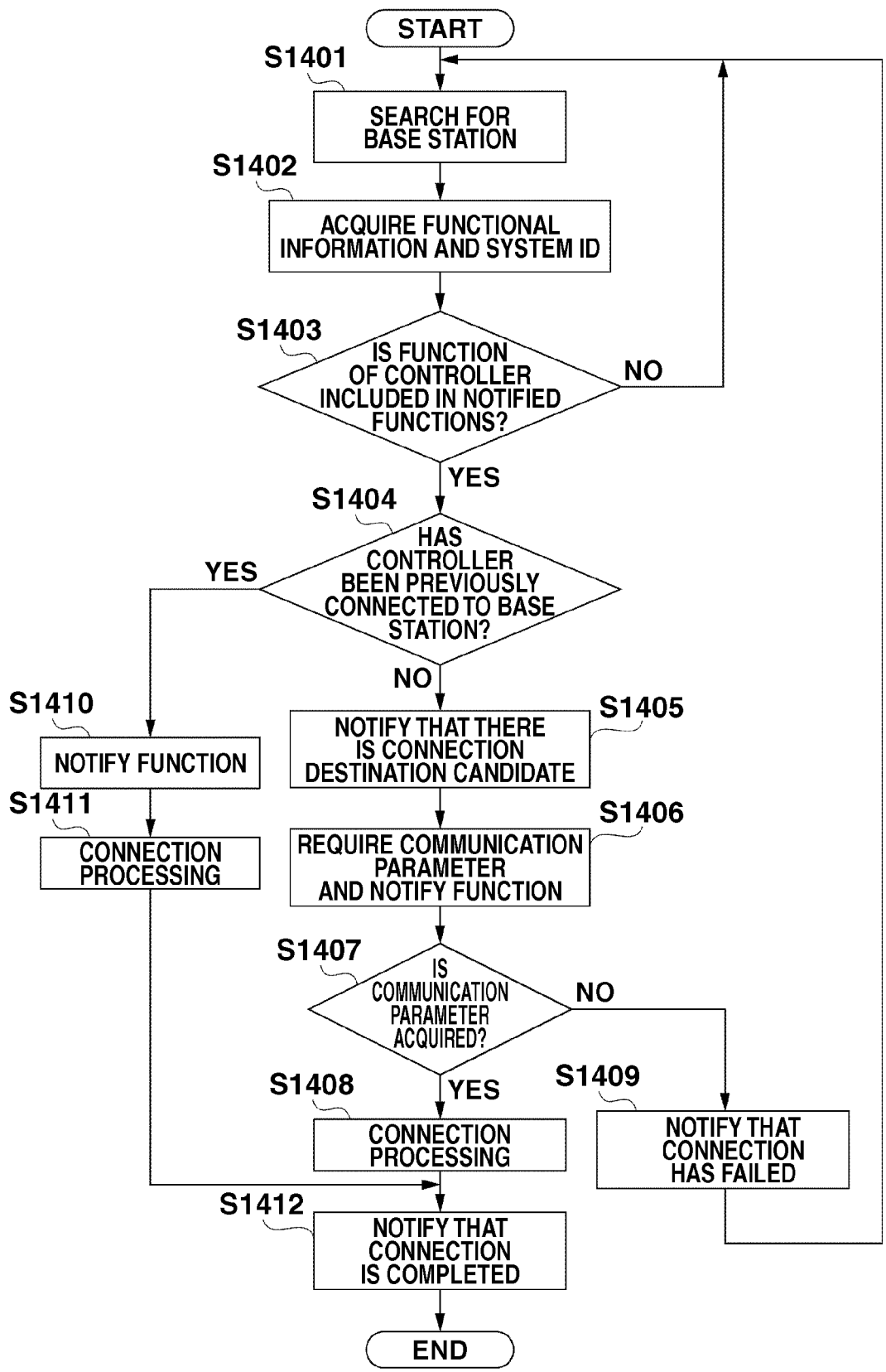

COMMUNICATION APPARATUS AND METHOD FOR CONTROLLING COMMUNICATION APPARATUS

BACKGROUND OF THE INVENTION

1. Field of the Invention

The present invention relates to notification of functions required in a wireless system.

2. Description of the Related Art

In recent years, a system has been established using a wireless local area network (LAN) conforming to Institute of Electrical and Electronics Engineers (IEEE) 802.11 series. When the system using the wireless LAN is established, an access point (AP) notifies a connecting method set in itself, and a station (STA) is connected to the AP based on the notified connecting method.

Furthermore, when a system in which a service can be provided by connecting a plurality of apparatuses having functions using a wireless LAN is established, the functions required in the system are to be grasped to connect the apparatuses having the desired function to each other. Conventionally, a user has grasped functions of apparatuses to connect the intended apparatuses to each other. The user has been able to confirm whether the apparatuses have the intended function by message exchange defined by Universal Plug and Play (UPnP) after being connected to each other.

When the wireless communication system is established, however, a user of an STA is to previously know to which of APs the STA should be connected to establish an intended system. Alternatively, the user of the STA is to confirm whether the intended system can be established by connecting the STA to the APs in order. This imposes a great burden on the user. When the STA is connected to the APs in order, the AP and the STA perform unnecessary connection and disconnection processing, so that the processing load on the apparatus is increased.

SUMMARY OF THE INVENTION

The present invention is directed to a communication apparatus notifying, when a wireless communication system is established, functions required in the wireless communication system, thereby reducing the load on the communication apparatus or a user to improve the convenience of the user.

According to an aspect of the present invention, a first communication apparatus for use in a network established by a plurality of communication apparatuses to implement a predetermined system function includes a sending unit configured to send, to the network, information on an apparatus function for implementing the predetermined system function to accommodate a communication apparatus having the apparatus function in the network, and an execution unit configured to execute processing for accommodating a second communication apparatus having the apparatus function sent by the sending unit in the network according to a request from the second communication apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a flowchart illustrating operations executed by a controller according to the exemplary embodiment of the present invention.

DESCRIPTION OF THE EMBODIMENTS

Various exemplary embodiments, features, and aspects of the invention will be described in detail below with reference to the drawings.

Figure 1A:
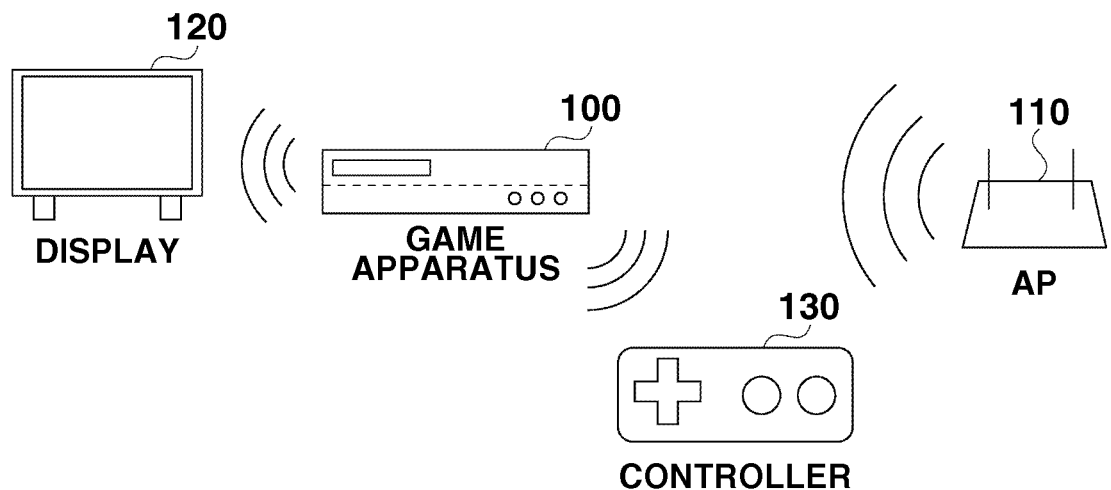
FIGS. 1A and 1B are diagrams illustrating the configuration of a wireless communication system according to each of exemplary embodiments of the present invention.

FIG. 1A illustrates the configuration of a wireless communication network according to a first exemplary embodiment of the present invention. The network is established by connecting communication apparatuses to one another using a wireless LAN conforming to IEEE 802.11 series, to implement a TV game system function as an example of a predetermined system function.

A game apparatus 100 serving as an example of a first communication apparatus operates as a base station (an access point (AP)). In the present exemplary embodiment, the game apparatus 100 also operates as a system management apparatus establishing a wireless communication system. An AP 110 is not associated with a TV game system. A display 120 serving as an example of a second communication apparatus operates as a station (an apparatus to be controlled by the base station). A controller 130 serving as an example of a third communication apparatus operates as a station. The controller 130 can detect a beacon serving as a notification signal for both the game apparatus 100 and the AP 110. In the present exemplary embodiment, the display 120 and the controller 130 operate as communication apparatuses participating in the TV game system.

Figure 2:
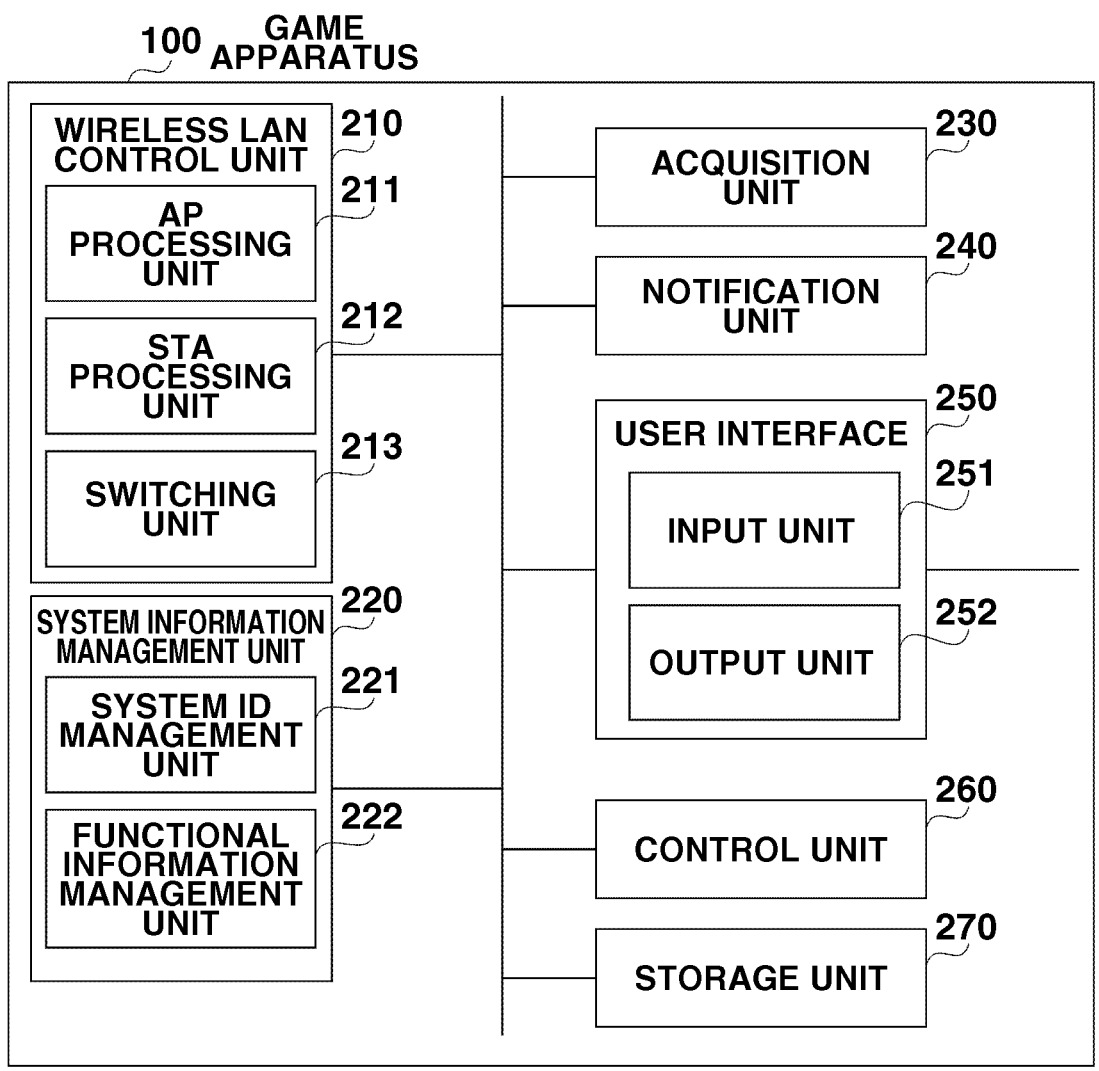
FIG. 2 illustrates the hardware configuration of a communication apparatus according to the exemplary embodiment of the present invention.

FIG. 2 illustrates the hardware configuration of the game apparatus 100. The game apparatus 100 includes a wireless LAN control unit 210, a system information management unit 220, an acquisition unit 230, a notification unit 240, a user interface 250, a control unit 260, and a storage unit 270. The wireless LAN control unit 210 includes an AP processing unit 211 for performing processing as a base station of the wireless LAN, and an STA processing unit 212 for performing processing as a station of the wireless LAN. The wireless LAN control unit 210 further includes a switching unit 213 for switching an operation into either one of the AP processing unit 211 and the STA processing unit 212. The system information management unit 220 includes a system identification (ID) management unit 221 and a functional information management unit 222. The system ID management unit 221 assigns a unique ID for each system and manages the ID. The functional information management unit 222 manages information (functional information) relating to functions required by the system and the function of the other communication apparatus. The acquisition unit 230 acquires the functional information notified by the other communication apparatus. The functional information management unit 222 manages the acquired functional information. The notification unit 240 notifies the functional information managed by the functional information management unit 222 using the wireless LAN control unit 210. The user interface 250 includes an input unit 251 for receiving operations for starting and stopping the wireless communication system from a user, and an output unit 252 for notifying the user of the states of the system and the communication apparatuses. The control unit 260 controls the whole game apparatus 100. The storage unit 270 stores a program or the like used in the present exemplary embodiment.

Figure 3:
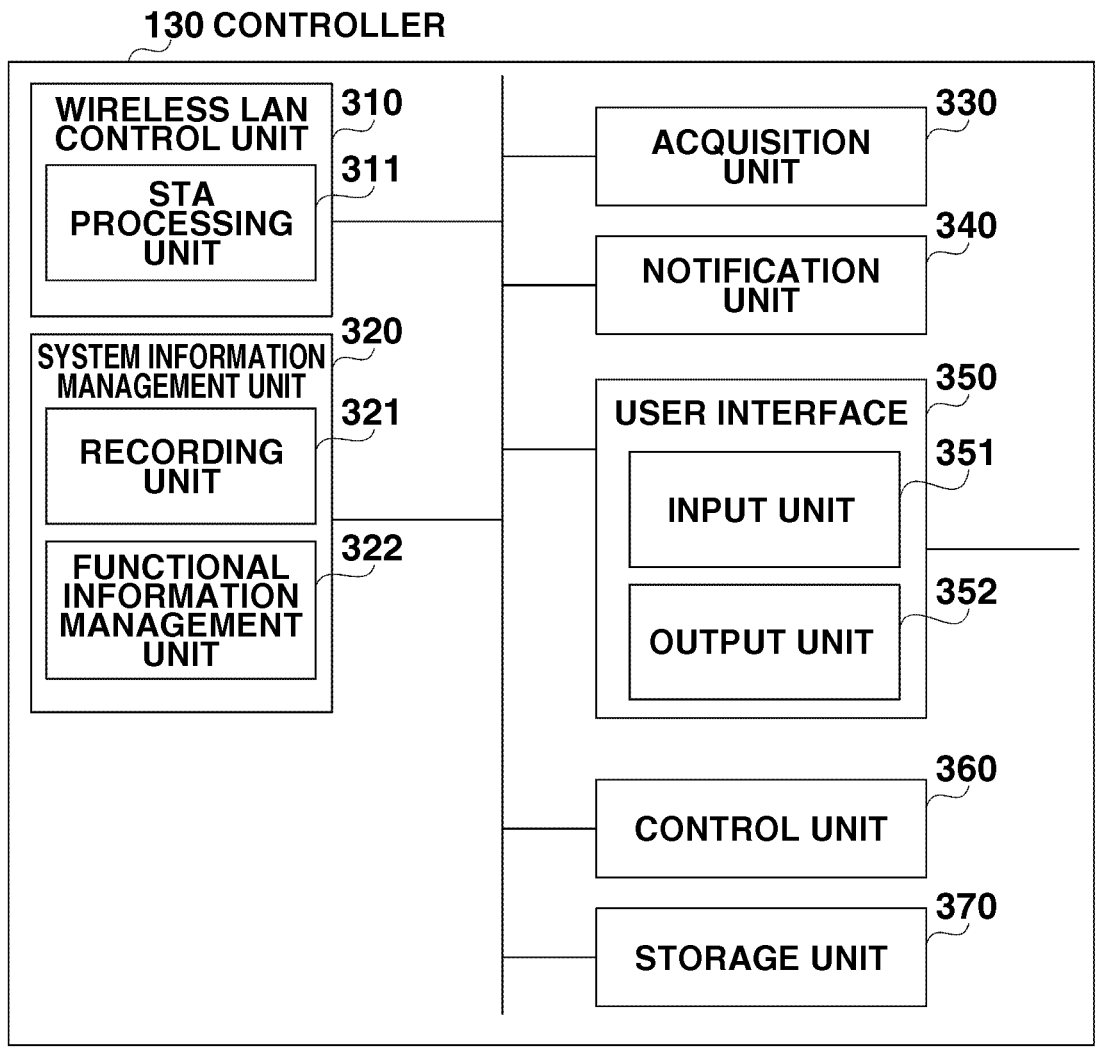
FIG. 3 illustrates the hardware configuration of a communication apparatus according to the exemplary embodiment of the present invention.

FIG. 3 illustrates the hardware configuration of the controller 130. The display 120 has a similar hardware configuration and hence, the description thereof is not repeated.

The controller 130 includes a wireless LAN control unit 310, a system information management unit 320, an acquisition unit 330, a notification unit 340, a user interface 350, a control unit 360, and a storage unit 370. The wireless LAN control unit 310 includes an STA processing unit 311 for performing processing as a station of the wireless LAN. The system information management unit 320 includes a recording unit 321 and a functional information management unit 322. The recording unit 321 records an ID unique for each system and information indicating whether connection to the system is successful or failed, which are notified by the system management apparatus. The functional information management unit 322 manages a function to be provided to the wireless communication system by the controller 130 itself and functions, which are notified by the system management apparatus, to be acquired by the acquisition unit 330. The acquisition unit 330 acquires information relating to the functions notified by the system management apparatus. The notification unit 340 notifies the system management apparatus of the function to be provided to the wireless communication system by the controller 130 itself using the wireless LAN control unit 310. The user interface 350 includes an input unit 351 receiving an operation for starting connection to the wireless communication system from the user, and an output unit 352 for notifying the user of the states of the system and the communication apparatuses. The control unit 360 controls the whole controller 130. The storage unit 370 stores a program or the like used in the present exemplary embodiment.

Figure 4:
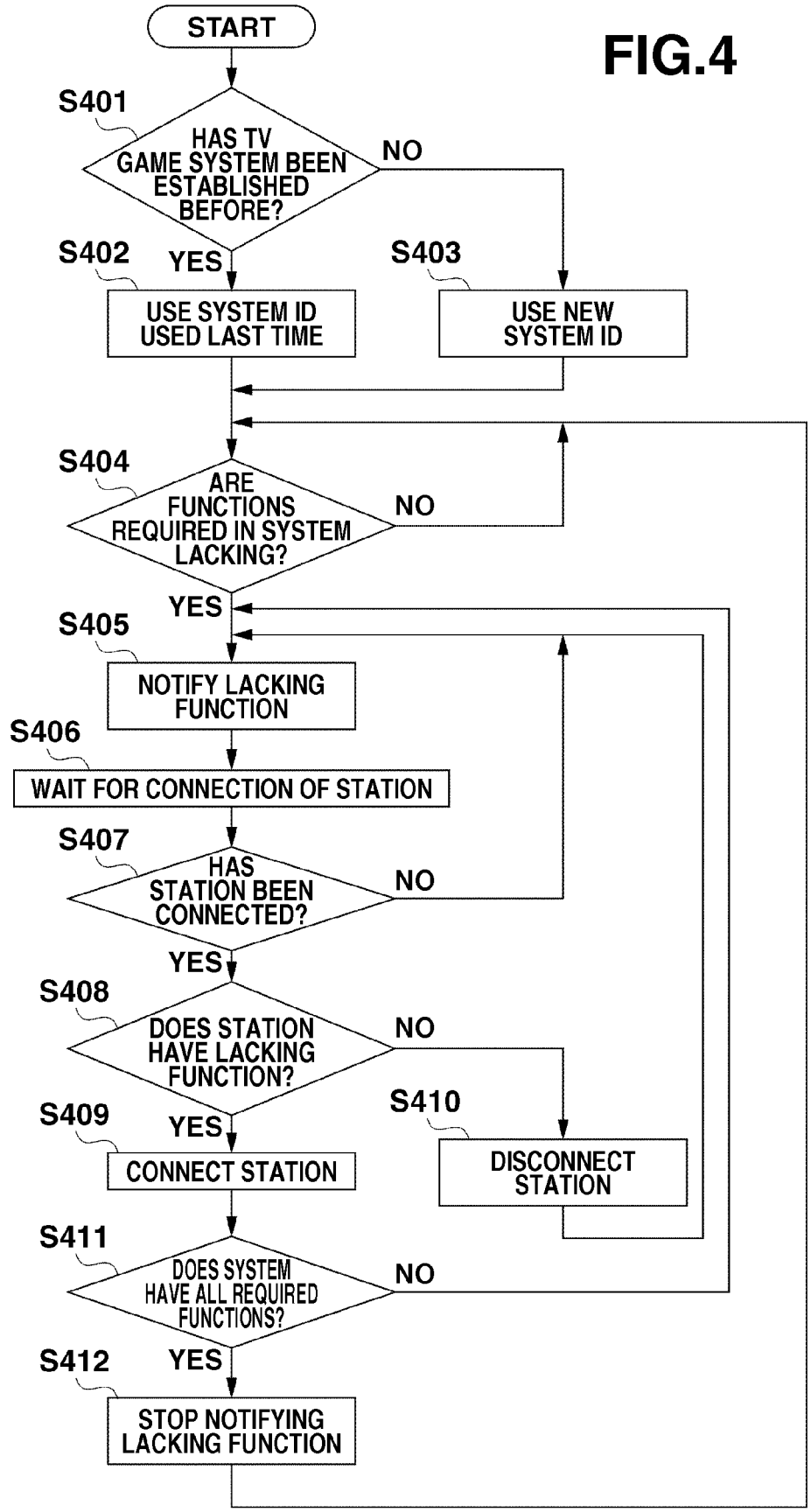
FIG. 4 is a flowchart illustrating operations executed by a game apparatus according to the exemplary embodiment of the present invention.

FIG. 4 is a flowchart illustrating operations for the control unit 260 in the game apparatus 100 to read out and execute the program stored in the storage unit 270. This processing is started when the user performs an operation for the game apparatus 100 to start to establish the TV game system.

In step S401, the control unit 260 first instructs the system ID management unit 221 to confirm whether the game apparatus 100 has established the TV game system as a system management apparatus before to determine a system ID to be used. The system ID is unique for each system. If the TV game system has been established before (YES in step S401), then in step S402, the control unit 260 instructs the system ID management unit 221 to use a system ID used last time. This enables the system management apparatus to manage the same system using the same system ID, thereby making the management easy. Therefore, the processing load on the communication apparatus is reduced. On the other hand, if the TV game system has not been established before (NO in step S401), then in step S403, the control unit 260 instructs the system. ID management unit 221 to newly assign a system ID to the TV game system. Here, the TV game system has not been established before. Therefore, the system ID management unit 221 newly assigns "1" as the system ID to the TV game system.

In step S404, the control unit 260 then instructs the system ID management unit 221 to determine whether functions required in the TV game system are lacking based on the required functions and functional information notified by the station connected to the game apparatus 100. Here, the storage unit 270 previously stores the functions required to operate as the TV game system. However, the present invention is not limited to this. Game software read out by the game apparatus 100 may store the functions required to operate as the TV game system.

If the required functions are not lacking as a result of the determination (NO in step S404), the control unit 260 instructs the notification unit 240 not to notify the functions but to only confirm a functional status until the system lacks the required functions by disconnecting the game apparatus 100, for example. If the required functions are lacking as a result of the determination (YES in step S404), then in step S405, the control unit 260 instructs the notification unit 240 to notify information relating to the lacking function and the system ID using a beacon (that transmits a beacon signal). Here, the game apparatus 100 requires a display function for displaying an image and a controller function for operating a game as apparatus functions. Since nothing is wirelessly connected to the game apparatus 100, the display function and the controller function are lacking. Therefore, the notification unit 240 notifies that the display function and the controller function are lacking and also notifies the system ID "1" using the beacon.

If the functions required in the system are thus lacking, information relating to the lacking function is notified. This enables the station to recognize functions required by the base station, thereby enabling the station to determine, before connection, whether the station is required in the system established by the base station. Therefore, the station need not perform processing for unnecessary connection and disconnection to and from the base station, so that the processing loads on the base station and the station (e.g., the communication apparatuses) can be reduced. A user of the station can know the functions required in the system before the station and the base station are connected to each other, so that the convenience of the user can be improved.

In step S406, the control unit 260 instructs the AP processing unit 211 to wait for the connection of the station while notifying the functional information.

In step S407, the control unit 260 determines whether the station has been connected. If the station has not been connected (NO in step S407), the processing returns to step S405. On the other hand, if the station has been connected (YES in step S407), the processing proceeds to step S408. Here, the display 120 having a display function has been connected.

If the station has been connected (YES in step S407), then in step S408, the control unit 260 instructs the acquisition unit 230 to acquire the functional information notified by the station, and instructs the functional information management unit 222 to confirm whether functional information notified by the game apparatus 100 includes the functional information notified by the station. Here, the game apparatus 100 acquires the display function notified by the display 120, and further confirms whether the functional information (the display function and the controller function) notified by itself includes the acquired display function.

If the functional information notified by the game apparatus 100 includes the functional information notified by the station (YES in step S408), then in step S409, the control unit 260 instructs the AP processing unit 211 to permit connection of the station and connect the station as processing for accommodating the station in the network, and then the processing proceeds to step S411. On the other hand, if the functional information notified by the game apparatus 100 does not include the functional information notified by the station (NO in step S408), then in step S410, the control unit 260 instructs the AP processing unit 211 to reject the connection of the station (disconnect the station), and then the processing returns to step S405. Here, the display 120 has the display function included in the functional information notified by the game apparatus 100. Thus, the game apparatus 100 permits connection of the display 120.

Thus, the connection is permitted for a station that has notified the functions required in the system, while being rejected for a station that has not notified the functions required in the system. Therefore, the base station need not maintain connection to a station not required in establishing the system, so that the processing load on the base station can be reduced.

If the connection to the station is completed, the control unit 260 instructs the functional information management unit 222 to recognize that the function notified by the station is added to the system. In step S411, the control unit 260 determines whether the system has all the required functions as a result of the recognition. If the system does not have all the required functions (NO in step S411), the processing returns to step S405. On the other hand, if the system has all the required functions (YES in step S411), the processing proceeds to step S412.

In step S412, the control unit 260 instructs the notification unit 240 to stop notifying the functions using the beacon. Here, it is determined that the controller function is lacking in step S411, and then the processing returns to step S405. By carrying out steps S405 to S410 again, the game apparatus 100 is connected to the controller 130 having the controller function. The game apparatus 100 determines that the TV game system has all the required functions by being connected to the display 120 and the controller 130 in step S411, and stops notifying the functions using the beacon in step S412.

If the system has all the required functions, the base station stops notifying the functions using the beacon, so that the processing load on the base station can be reduced. The user of the station can know that the system has all the required functions without making connection to the base station, so that the convenience of the user is improved.

Figure 5:
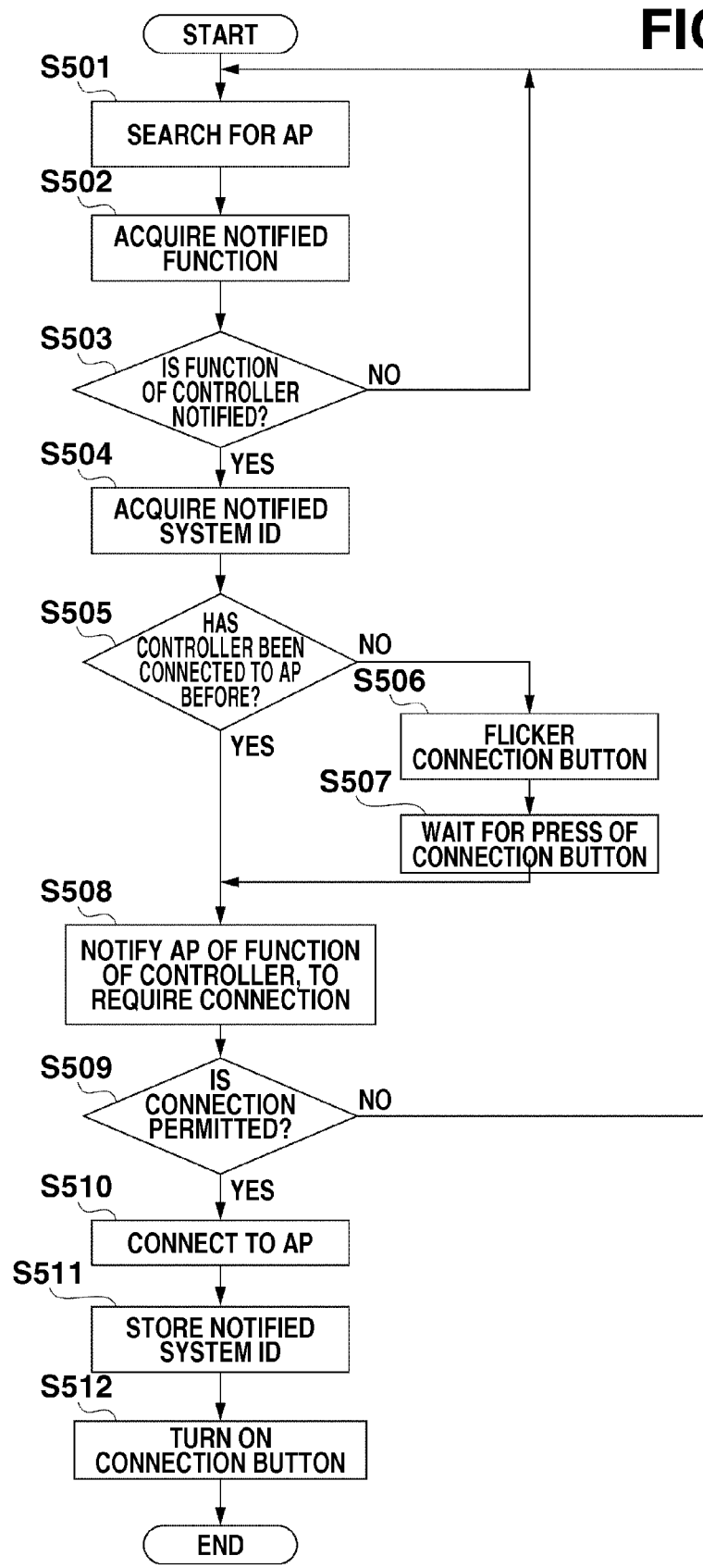
FIG. 5 is a flowchart illustrating operations executed by a controller according to the exemplary embodiment of the present invention.

FIG. 5 is a flowchart illustrating operations for the control unit 360 to read out and execute the program stored in the storage unit 370. This processing is started when the user performs an operation for the controller 130 to start to establish the TV game system.

In step S501, the control unit 360 first instructs the STA processing unit 311 to search for the base station that sends out a beacon. Here, the AP 110 is searched for. If the AP 110 is found out, then in step S502, the control unit 360 instructs the acquisition unit 330 to acquire functional information notified by the base station. Since the AP 110 does not notify functional information, the acquisition unit 330 cannot acquire functional information.

In step S503, the control unit 360 then instructs the functional information management unit 322 to confirm whether the notified functional information includes the function of the controller 130. If the notified functional information includes the function of the controller 130 (YES in step S503), the processing proceeds to step S504. On the other hand, if the notified functional information does not include the function of the controller 130 (NO in step S503), the processing returns to step S501 without performing processing for connection to the AP 110. Here, the AP 110 does not notify functional information. Therefore, it is determined that the notified functional information does not include the controller function of the controller 130, and then the processing returns to step S501. The game apparatus 100 is then searched for in step S501. The controller 130 acquires the display function and the controller function as functional information notified by the game apparatus 100 in step S502. The functional information notified by the game apparatus 100 includes the controller function corresponding to the function of the controller 130 in step S503, and then the processing proceeds to step S504.

If the station does not have a function included in functions required in the system, the station is not connected to the base station. Therefore, the station need not perform processing for unnecessary connection and disconnection to and from the base station in establishing the system. Therefore, the processing load on the communication apparatus can be reduced.

In step S504, the control unit 360 instructs the system information management unit 320 to acquire a system ID notified by the AP 110. Here, the controller 130 acquires a system ID "1" from the game apparatus 100.

In step S505, the control unit 360 further instructs the system information management unit 320 to determine whether the controller 130 has been connected to the AP 110 before to establish a system identified by the acquired system ID. If the controller 130 has been connected to the AP 110 before to establish the system identified by the acquired system ID (YES in step S505), then in step S508, the control unit 360 starts connection processing without waiting for a user's operation. When a system that has been established before is established again, the connection processing is automatically started. This saves the user time and labor, so that the convenience of the user is improved. On the other hand, if the controller 130 has not been connected to the AP 110 before to establish the system identified by the acquired system ID (NO in step S505), then in step S506, the control unit 360 instructs the user interface 350 to notify the user that candidates for connection destinations exist.

In step S507, the control unit 360 instructs the STA processing unit 311 not to perform the connection processing until the user performs a connecting operation. Here, the controller 130 has not been connected to the AP 110 before to establish a system identified by the system ID "1" in step S505, and then the processing proceeds to step S506. The controller 130 flickers a connection button serving as an example of the output unit 352 to notify the user that candidates for connection destinations exist in step S506. However, the present invention is not limited to this. A notification method such as message display on a screen, sound, or vibration may be used.

Thus, the station having a function included in the functions required in the system makes notification for prompting the user to make connection to the base station. Therefore, the user can easily specify the station having the function included in the functions required in the system, so that the convenience of the user is improved.

If the user performs the connecting operation, then in step S508, the control unit 360 instructs the notification unit 340 to notify the AP 110 of the function of the controller 130 when the controller 130 is connected to the AP 110. Here, the game apparatus 100 is notified that the controller 130 has the controller function.

In step S509, the control unit 360 instructs the STA processing unit 311 to determine whether the connection is permitted. If the connection is permitted from the AP 110 (YES in step S509), then in step S510, the control unit 360 instructs the STA processing unit 311 to execute the remaining connection processing. If the connection is completed, then in step S511, the control unit 360 instructs the recording unit 321 to store the notified system ID as an ID of a system successful in connection.

In step S512, the control unit 360 instructs the output unit 352 to notify the user that the connection is successful. On the other hand, if the connection is rejected from the AP 110 (NO in step S509), the processing returns to step S501. Here, the connection is permitted from the game apparatus 100 in step S509, and the connection to the game apparatus 100 is completed in step S510. The system ID "1" is stored in step S511. The user is notified that the connection is successful in step S512.

Thus, the station whose connection has been rejected is not connected to the base station. Therefore, the processing loads on the station and the base station (e.g., the communication apparatuses) are reduced. Only the station whose connection is permitted is connected to the base station, so that the security of the system is improved. In order to notify the user that the connection is successful, the user can grasp a connection status, so that the convenience of the user is improved.

The display 120 is also connected to the game apparatus 100 by executing a similar flowchart to the above-mentioned controller 130.

Figure 6:
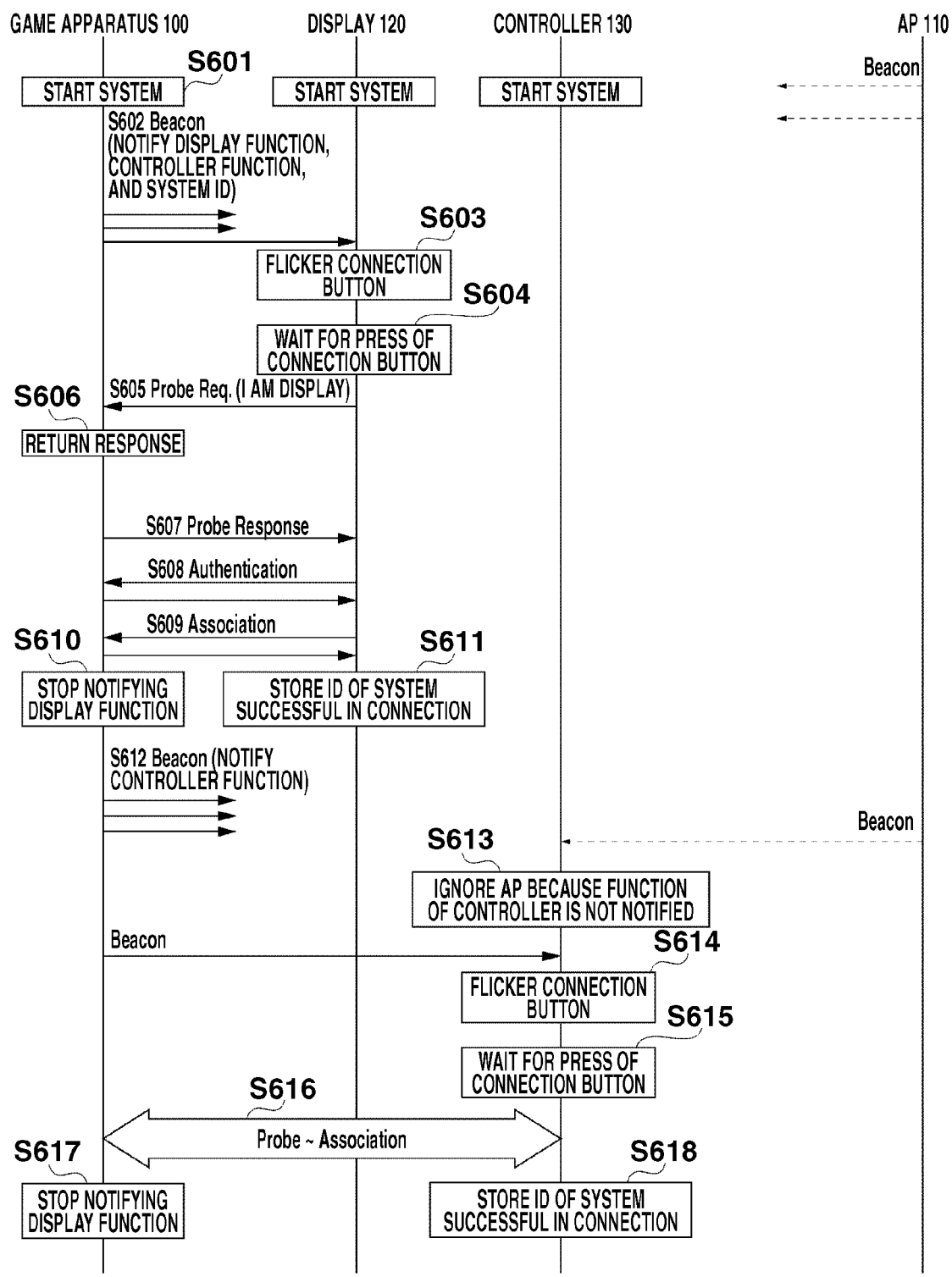
FIG. 6 is a sequence chart illustrating operations according to the exemplary embodiment of the present invention.

FIG. 6 is a sequence chart in the system configuration illustrated in FIG. 1A. FIG. 6 illustrates a case where the game apparatus 100 first establishes the TV game system. In an initial state, the game apparatus 100, the display 120, the controller 130, and the AP 110 have not been connected to one another yet.

In step S601, the game apparatus 100, the display 120, and the controller 130 first start to establish the TV game system. The establishment of the system may be started by a user's operation such as press of a button. Alternatively, the establishment of the system may be unconditionally started at the same time that the power is turned on. In step S602, the game apparatus 100 that operates as a system management apparatus notifies the functions lacking to operate as the TV game system and a system ID newly assigned using a beacon. The display 120 that has received the beacon acquires the notified functions and system ID. The acquired functions include a function to be provided by the display 120 itself. The system ID is an unknown system ID that has not been connected before.

In step S603, the display 120 notifies the user that candidates for connection destinations exist, to wait for a connecting operation from the user. In step S604, the display 120 executes the connecting operation from the user. In step S605, the display 120 sends to the game apparatus 100 a connection request carrying information relating to the function provided by the display 120.

This sequence assumes a case where the game apparatus 100 first establishes the TV game system. Therefore, the user's operation is required in the connection, as described above. At the second and subsequent times of establishing the system, however, the existing system ID is notified. Therefore, the display 120 can automatically send the connection request to the game apparatus 100 without waiting for the user's operation.

In steps S606 and S607, the game apparatus 100 is notified of the notified function by the display 120, and thus returns a response message to permit connection of the display 120. In steps S608 and S609, the remaining connection processing is then executed between the game apparatus 100 and the display 120. If the connection is completed, then in step S610, the game apparatus 100 determines that the display function is provided to the system, to stop notifying the display function. In step S611, the display 120 stores the system ID notified by the game apparatus 100 as an ID of a system successful in connection.

The controller 130 detects respective beacons from both the game apparatus 100 and the AP 110. In the beacon from the AP 110, information relating to a function provided by the controller 130 is not notified. In step S613, the controller 130 does not use the AP 110 as a connection object. On the other hand, in the beacon from the game apparatus 100, the information relating to the function provided by the controller 130 is notified. Therefore, the controller 130 uses the game apparatus 100 as a connection object. The subsequent connection processing (steps S614 to S618) in which the game apparatus 100 is recognized as a connection object is similar to the connection processing (steps S603 to S611) of the display 120.

According to the first exemplary embodiment, when the system is established, the load on the communication apparatus or the user can be reduced. In the controller 130, for example, an AP to be connected (the game apparatus 100) can be found out from a plurality of APs prior to connection. Therefore, power consumption caused by unnecessary communication can be reduced. A period of time elapsed until the station is connected to the base station to establish a system having a predetermined object can be shortened. The user can only perform a simple connecting operation (presses the connection button in the present exemplary embodiment) to establish a wireless communication system without performing a complicated operation to set information relating to the station to be connected, so that the convenience of the user is improved.

Figure 1B:
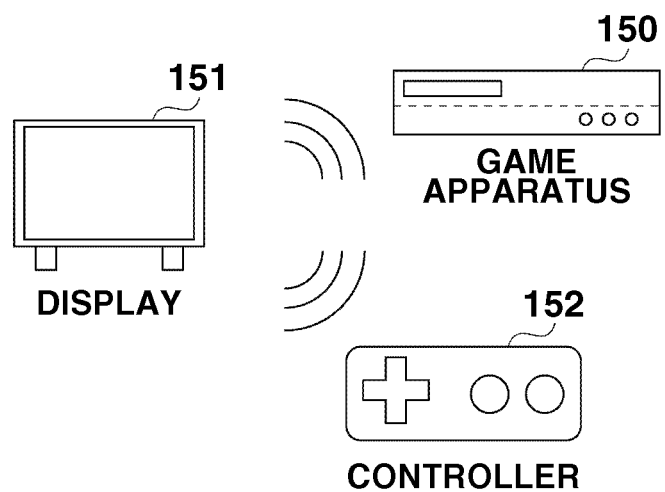

FIG. 1B illustrates an example of a system configuration according to a second exemplary embodiment of the present invention. The second exemplary embodiment is similar to the first exemplary embodiment in that a game apparatus 150, a display 151, and a controller 152 are connected to one another using a wireless LAN conforming to IEEE 802.11 series, to establish a TV game system. In the present exemplary embodiment, the game apparatus 150 operates as a system management apparatus for the TV game system with the display 151 operating as an AP. The hardware configuration of the game apparatus 150 is illustrated in FIG. 2 and is similar to that in the first exemplary embodiment and hence, the description thereof is not repeated. The hardware configuration of the display 151 is similar to that of the game apparatus 150 and is illustrated in FIG. 2 and hence, the description thereof is not repeated. The hardware configuration of the controller 152 is illustrated in FIG. 3 and is similar to that in the first exemplary embodiment and hence, the description thereof is not repeated. The operations of the controller 152 are similar to those in the first exemplary embodiment illustrated in FIG. 5 and hence, the description thereof is not repeated.

Figure 7:
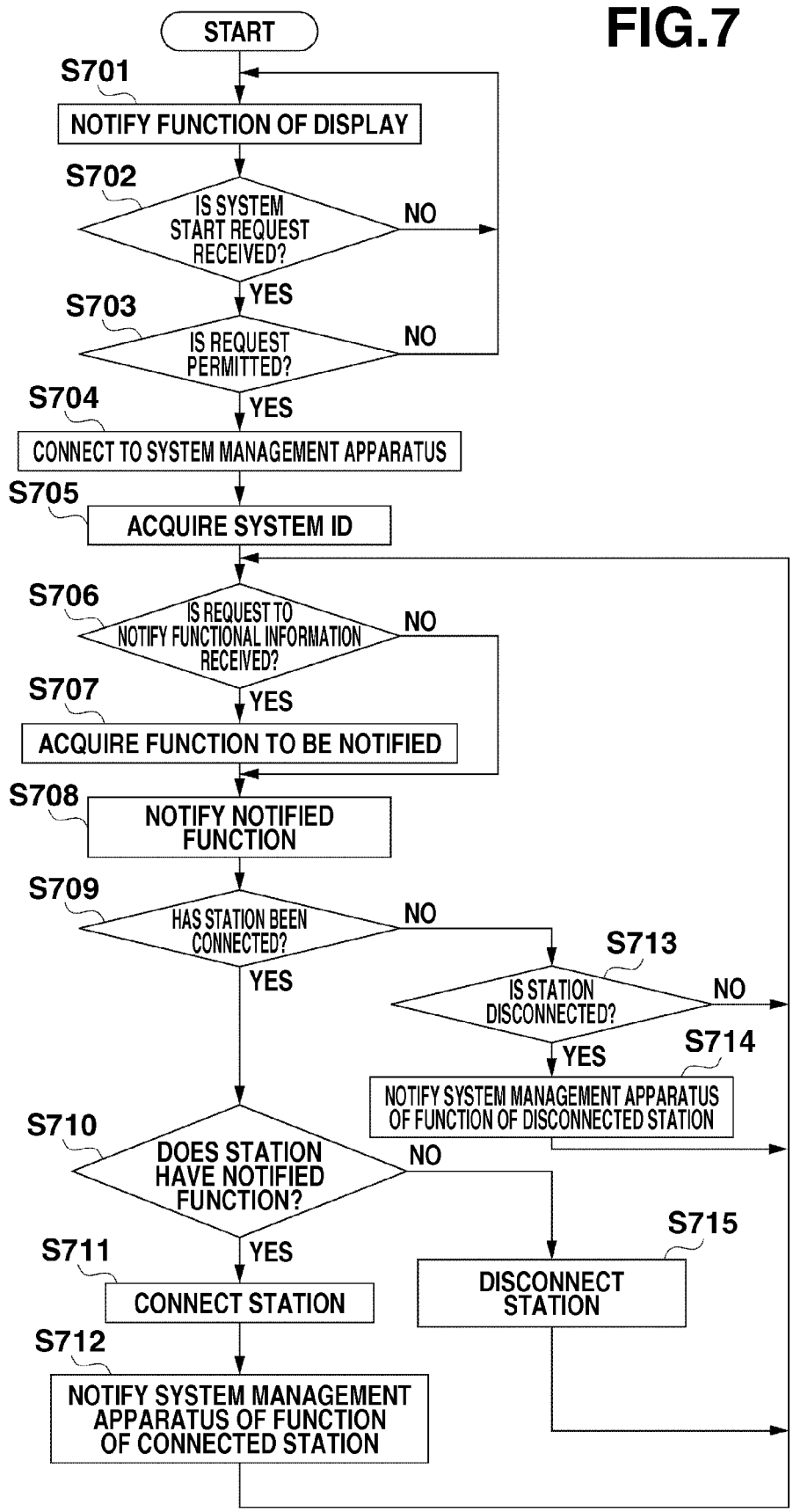
FIG. 7 is a flowchart illustrating operations executed by a display according to the exemplary embodiment of the present invention.

FIG. 7 is a flowchart illustrating operations for a control unit 260 in the display 151 to read out and execute the program stored in a storage unit 270. This processing is started when the display 151 starts to operate as an AP 110.

In step S701, the control unit 260 instructs a notification unit 240 to notify information relating to the function of the display 151. This information is notified until a request to start a wireless communication system is permitted from the system management apparatus (YES in step S703). Here, the notification unit 240 notifies that the display 151 has a display function using a beacon.

In step S702, the control unit 260 then instructs a system information management unit 220 to determine whether a request to start the wireless communication system is received from the system management apparatus. If the request to start the wireless communication system is received (YES in step S702), then in step S703, the control unit 260 determines whether the notification of functions required in the system is started according to the request. The determination whether the request is permitted is made depending on whether the display 151 operates a management function for another system or setting by the user, for example. Here, a system start request from the game apparatus 150 is received, to permit the request.

If the request from the system management apparatus is permitted (YES in step S703), then in step S704, the control unit 260 instructs an AP processing unit 211 to perform processing for connection to the system management apparatus.

In step S705, the control unit 260 instructs a system ID management unit 221 to acquire a system ID notified by the system management apparatus. Here, the system ID management unit 221 acquires "1" as the system ID from the game apparatus 150.

In step S706, the control unit 260 then instructs a functional information management unit 222 to determine whether a request to notify functional information is received from the system management apparatus. This can deal with a system management apparatus (e.g., a conventional system management apparatus) that does not make the request to notify functional information. If the request is received (YES in step S706), the processing proceeds to step S707. If the request is not received (NO in step S706), the processing proceeds to step S708. Here, the request to notify functional information is received from the game apparatus 150, and then the processing proceeds to step S707.

In step S707, the control unit 260 instructs an acquisition unit 230 to acquire functional information required to establish the system from the system management apparatus. Here, a controller function is acquired as functional information required to establish the system from the game apparatus 150.

In step S708, the control unit 260 then instructs the notification unit 240 to notify the system ID and the functional information that are notified by the system management apparatus using the beacon. Here, the notification unit 240 notifies the controller function as the functions required in the system using the beacon.

Thus, a base station notifies, out of the functions required in the system, the lacking function, thereby enabling determination whether a station should be connected to the base station. Therefore, the station need not perform processing for unnecessary connection and disconnection to and from the base station in establishing the system, so that the processing load on the station can be reduced. The user can know a function required for the base station to establish the system before the station and the base station are connected to each other, so that the convenience of the user can be improved.

In step S709, the control unit 260 determines whether the station requires connection of the display 151. If the station requires connection of the display 151 (YES in step S709), then in step S710, the control unit 260 instructs the functional information management unit 222 to acquire a function notified by the station, to confirm whether the functions notified by the display 151 include the function notified by the station. If the functions notified by the display 151 include the function notified by the station (YES in step S710), then in step S711, the control unit 260 instructs the AP processing unit 211 to connect the station. If the connection of the station is completed, then in step S712, the control unit 260 instructs the notification unit 240 to notify the system management apparatus of information relating to the function notified by the station. If the functions notified by the display 151 do not include the function notified by the station (NO in step S710), then in step S715, the control unit 260 instructs the AP processing unit 211 not to permit the connection of the station. Here, the controller 152 requires connection of the display 151. Since the controller 152 has a controller function notified by the display 151 in step S710, the controller 152 is connected. The system management apparatus is further notified that the controller function is added in step S712.

Thus, the connection is permitted for a station that has notified functional information required for the base station to establish the system, while being rejected for a station that has not notified the functional information required for the base station to establish the system. Therefore, the base station need not maintain unnecessary connection to the station in establishing the system, so that the processing load on the base station can be reduced.

In step S713, the control unit 260 also instructs the AP processing unit 211 to monitor whether the station that has already been connected is disconnected. If the station is disconnected (YES in step S713), the control unit 260 instructs the notification unit 240 to notify the system management apparatus of information relating to the function notified by the station that has been disconnected. The monitoring of the disconnection of the station that has already been connected enables functional information required to establish the system to be notified again even when the station is disconnected, so that the convenience of the user is improved.

Figure 8:
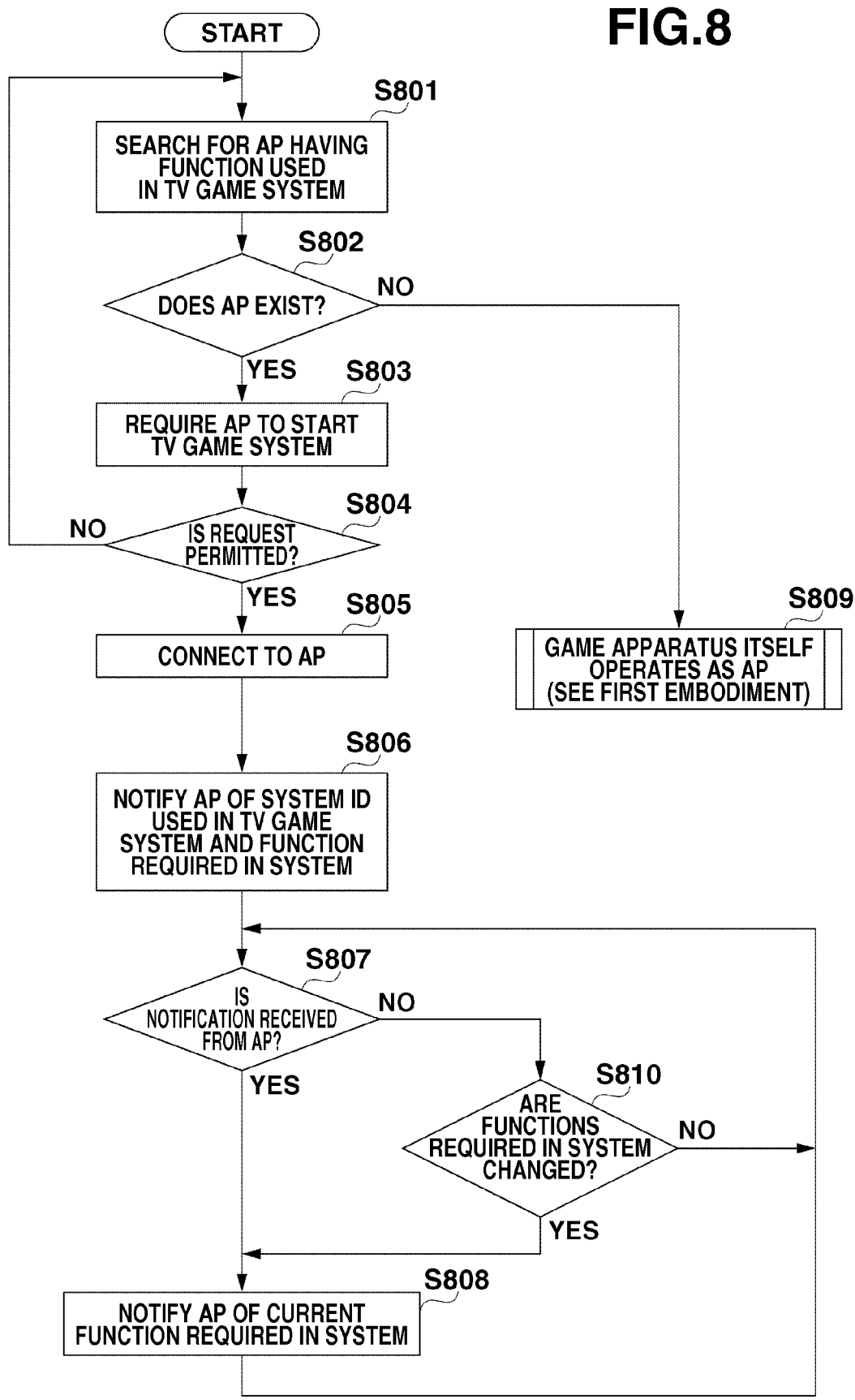
FIG. 8 is a flowchart illustrating operations executed by a game apparatus according to the exemplary embodiment of the present invention.

FIG. 8 is a flowchart illustrating operations for the control unit 260 in the game apparatus 150 to read out and execute the program stored in the storage unit 270. This processing is started when the user performs an operation for the game apparatus 150 to start to establish the TV game system.

In step S801, the control unit 260 first instructs an STA processing unit 212 to search for a base station having a function included in the functions used in the TV game system.

In step S802, the control unit 260 determines whether the base station exists. If the base station is found out (YES in step S802), then in step S803, the control unit 260 instructs the system information management unit 220 to send to the base station a request to start the TV game system. Here, the display 151 having the display function as the functions used in the TV game system is found out, and a request to start the TV game system is sent to the display 151.

In step S804, the control unit 260 determines whether the base station permits the request to start the TV game system. If the start request is permitted (YES in step S804), then in step S805, the control unit 260 instructs the STA processing unit 212 to perform processing for connection to the base station. If the start request is not permitted (NO in step S804), the control unit 260 instructs the STA processing unit 212 to search for another base station having a function included in the functions used in the TV game system. If the base station that permits the start request does not exist (NO in step S802), then in step S809, the game apparatus 150 itself operates as a base station, to perform the operations illustrated in FIG. 4. The operations illustrated in FIG. 4 are similar to those in the first exemplary embodiment and hence, the description thereof is not repeated. Here, the display 151 permits the request to start the TV game system, to perform processing for connection to the display 151.

If the base station that permits the request to start the TV game system does not thus exist, the game apparatus 150 itself operates as a base station. Therefore, an operation as a base station and an operation as a station are automatically switched according to situations (the presence or absence of the base station that permits the request to start the system), so that the convenience of the user is improved.

If the connection to the base station is made in step S805, then in step S806, the control unit 260 instructs the system ID management unit 221 to notify a system ID used in the TV game system and functional information to be notified by the base station together. Here, "1" and a controller function are respectively notified as a system ID and functional information when the game apparatus 150 is connected to the display 151. If the connection to the base station is completed, the game apparatus 150 monitors the excess or deficiency of the functions provided to the TV game system.

In step S807, the control unit 260 determines whether notification of connection/disconnection to/from the station is received from the base station. If the notification is received (YES in step S807), then in step S808, the control unit 260 instructs the functional information management unit 222 to notify the base station of changed functional information required to establish the system. If the notification is not received (NO in step S807), then in step S810, the control unit 260 determines whether a required function is added/deleted by a change in the state of the system. If the required function is added/deleted (YES in step S810), then in step S808, the control unit 260 instructs the functional information management unit 222 to notify the base station of the changed functional information required to establish the system.

A case where the required function is added/deleted by the change in the state of the system includes a case where the display 151 is connected to the main body of the game apparatus 100 by wire so that a display function is not required, and a case where functions required to operate as the TV game system are read out of game software so that different types of controllers are required according to situations where a game progresses. Although in the present exemplary embodiment, an AP is notified of a required function, it may be notified of a changed function. The system management apparatus notifies the base station of the functions required in the system in response to the change in the state of the system. Even when the state of the system is changed, therefore, the station can recognize that the required functions are changed, so that the convenience of the user is improved.

Figure 9:
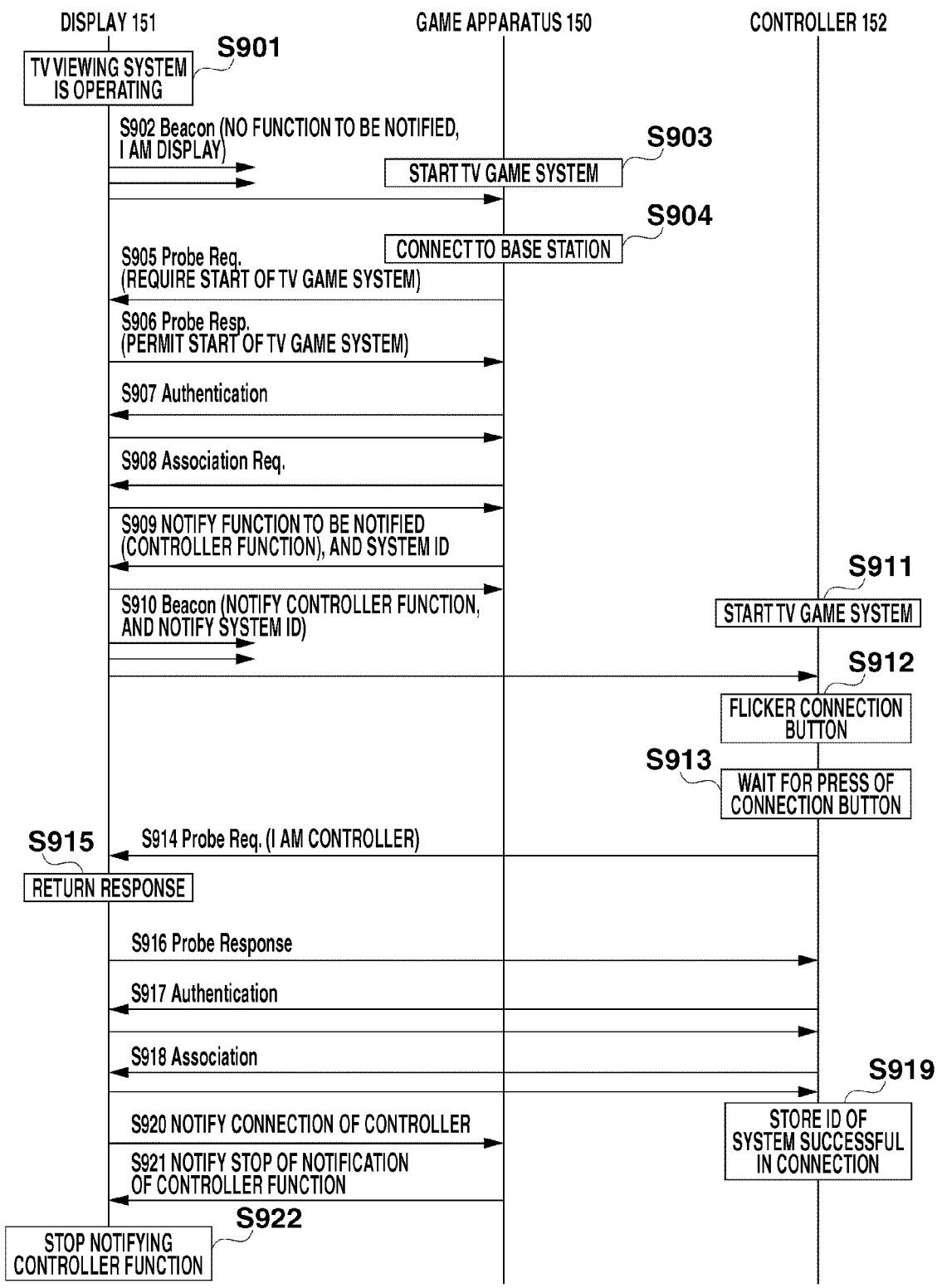
FIG. 9 is a sequence chart illustrating operations according to the exemplary embodiment of the present invention.

FIG. 9 is a sequence chart in the system configuration illustrated in FIG. 1B. FIG. 9 illustrates a case where the game apparatus 100 first establishes the TV game system. As an initial state, the game apparatus 150, the display 151, and the controller 152 have not been connected to one another yet.

The display 151 is operating as a base station. In step S901, the display 151 is operating as a system management apparatus for a system (a TV viewing system) different from the TV game system. In step S902, the display 151 notifies a user that the display 151 has the display function using a beacon in this state. On the other hand, in step S903, the TV game system is started in the game apparatus 150. The game apparatus 150 starts to search for a base station having a function included in the functions required in the TV game system.

In step S904, the game apparatus 150 recognizes that the display 151 is the base station having the function (a display function) included in the functions required in the TV game system from the beacon illustrated in step S902, to start connection to the display 151. In step S905, the game apparatus 150 simultaneously requires the display 151 to start the TV game system. If the display 151 permits the request received in step S905, then in step S906, the display 151 returns a response to the game apparatus 150. Here, the request is permitted. If the request is rejected, however, the display 151 notifies the game apparatus 150 that the request has been rejected by not returning the response illustrated in step S906 or returning a message that the request has been rejected. The determination whether the display 151 permits the request may be made by a user's operation.

If the game apparatus 150 detects that the request to start the TV game system is permitted, then in steps S907 and 5908, processing for connection to the display 151 is executed. If the connection is completed, then in step S909, the game apparatus 150 notifies the display 151 of functional information and a system ID to be notified. In step S910, the display 151 that has received the notification notifies the functional information and the system 1D using the beacon according to the received information.

In step S911 to 5919, the controller 152 is connected to the display 151 in similar processing to that in the first exemplary embodiment illustrated in FIGS. 5 and 6. If the connection of the controller 152 is completed, then in step S920, the display 151 notifies the game apparatus 150 that the controller function is added. In step S921, the game apparatus 150 detects that the system has the controller function upon receipt of the notification, to notify the display 151 to stop notifying the controller function. In step S922, the display 151 stops notifying the controller function upon receipt of the notification.

According to the second exemplary embodiment, even when a communication apparatus having the functions required in the system and a communication apparatus having the function of the base station differ from each other, a load applied to the communication apparatus or the user can be reduced.

In a third exemplary embodiment according to the present invention, a method for transferring the function of a base station from a display 151 to a game apparatus 150 to establish a TV game system in a system configuration (FIG. 1B) similar to that in the second exemplary embodiment will be described. The hardware configuration of each of communication apparatuses is similar to that in the second exemplary embodiment and hence, the description thereof is not repeated. An AP processing unit 211 and an STA processing unit 212 in the game apparatus 150 according to the present exemplary embodiment can operate in parallel. An AP processing unit 211 and an STA processing unit 212 in the display 151 can also operate in parallel. The operations of a controller 152 in the present exemplary embodiment are similar to the operations in the first exemplary embodiment illustrated in FIG. 5 and hence, the description thereof is not repeated.

Figure 10:
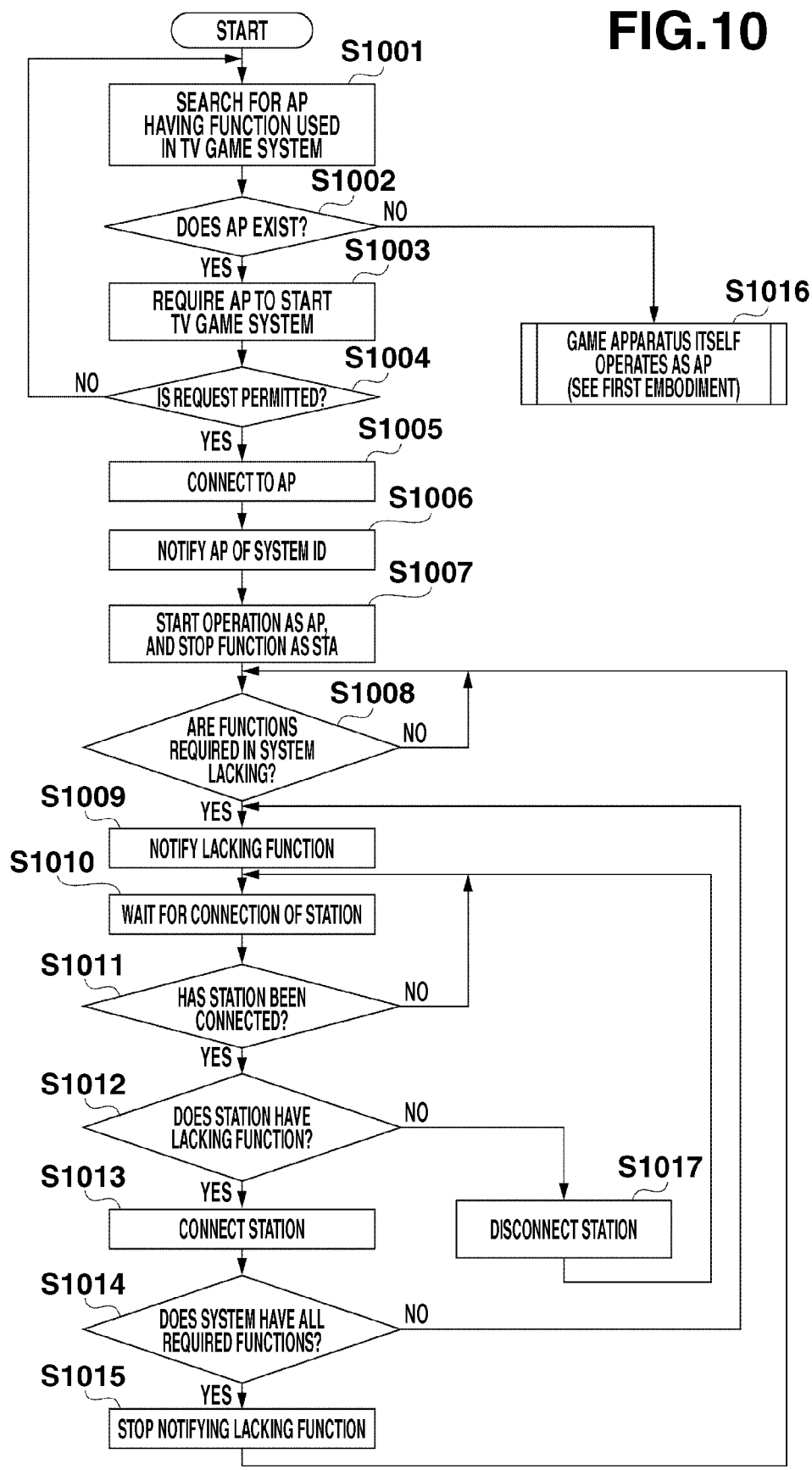
FIG. 10 is a flowchart illustrating operations executed by a game apparatus according to the exemplary embodiment of the present invention.

FIG. 10 is a flowchart illustrating operations for a control unit 260 in the game apparatus 150 to read out and execute a program stored in a storage unit 270. This processing is started when a user performs an operation for the game apparatus 150 to start to establish the TV game system.

In step S1001, the control unit 260 first instructs the STA processing unit 212 to search for a base station having a function included in functions in the TV game system.

In step S1002, the control unit 260 determines whether the base station exists. If the base station is found out (YES in step S1002), then in step S1003, the control unit 260 instructs a system information management unit 220 to send to the base station a request to start the TV game system. Here, the display 151 is found out as the base station. The system information management unit 220 sends to the display 151 a request to start the TV game system.

In step S1004, the control unit 260 determines whether the base station permits the request to start the TV game system. If the start request is permitted (YES in step S1004), then in step S1005, the control unit 260 instructs the STA processing unit 212 to perform processing for connection to the base station. If the start request is not permitted (NO in step S1004), the control unit 260 instructs the STA processing unit 212 to search for another base station having a function included in the functions used in the TV game system. If the base station that permits the start request does not exist (NO in step S1002), then in step S1016, the game apparatus 150 itself operates as a base station, to perform the operations illustrated in FIG. 4. The operations illustrated in FIG. 4 are similar to those in the first exemplary embodiment and hence, the description thereof is not repeated. Here, the display 151 permits the request to start the TV game system, to perform processing for connection to the display 151.

If the base station that permits the request to start the TV game system does not exist, the game apparatus 150 itself operates as a base station. Therefore, an operation as a base station and an operation as a station are automatically switched according to situations (the presence or absence of the base station that permits the request to start the system), so that the convenience of the user is improved.

If the connection to the base station is made in step S1005, then in step S1006, the control unit 260 instructs the system information management unit 220 to notify a system ID used in the TV game system together. If the notification of the system ID is completed, then in step S1007, the control unit 260 instructs a switching unit 213 to stop a function as a station and start an operation as a base station. The base station may be further instructed to stop a function as a base station and start an operation as a station. Thus, the connection of the game apparatus 150 used as a station and the display 151 used as abase station is terminated. The game apparatus 150 is used as a station, and the display 151 is used as a base station, to connect the game apparatus 150 and the display 151 again.

The subsequent operations (steps S1008 to S1017) are similar to steps S404 to S412 in the first exemplary embodiment illustrated in FIG. 4 and hence, the description thereof is not repeated.

Figure 11:
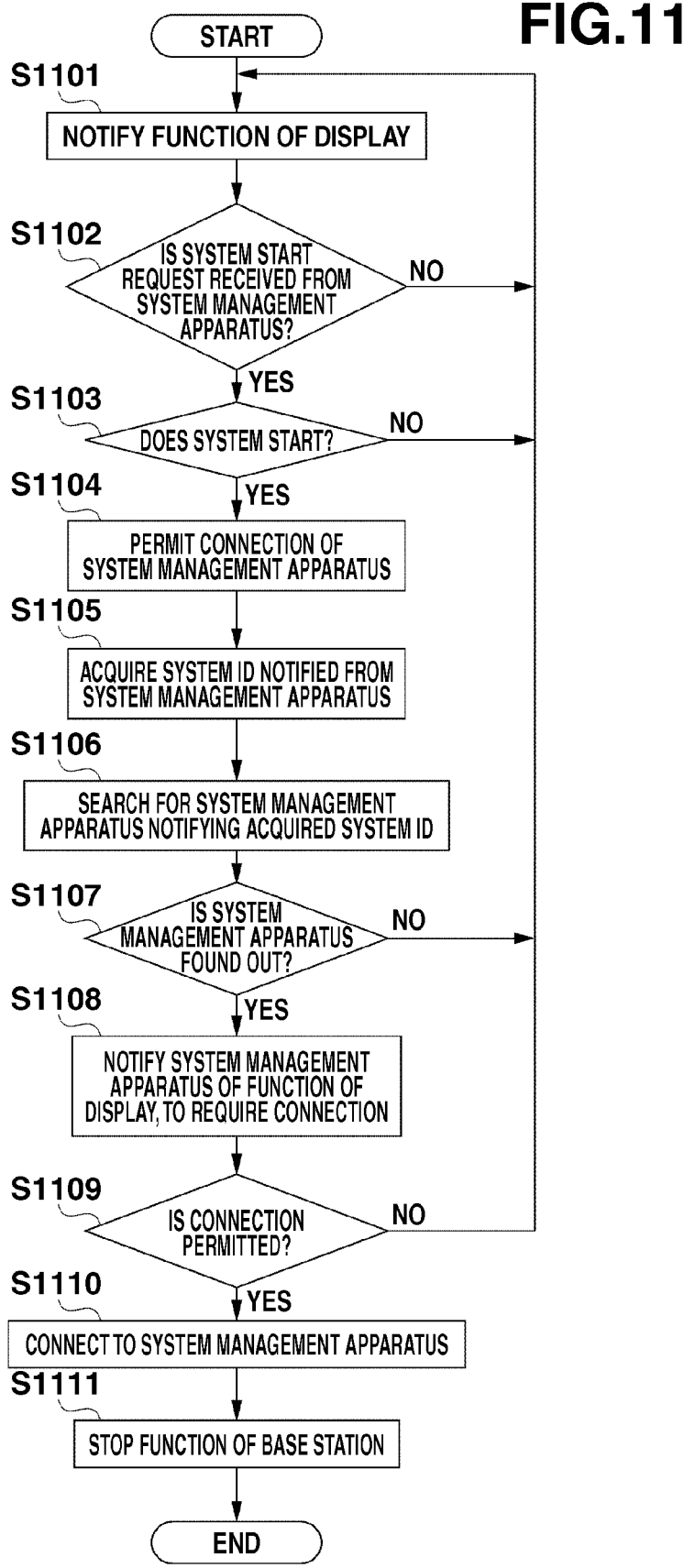
FIG. 11 is a flowchart illustrating operations executed by a display according to the exemplary embodiment of the present invention.

FIG. 11 is a flowchart illustrating operations for the control unit 260 in the display 151 to read out and execute the program stored in the storage unit 270. This processing is started when the display 151 starts to operate as a base station.

In step S1101, the control unit 260 instructs a notification unit 240 to notify information relating to the function of the display 151 (a display function) using a beacon. The functional information is notified using the beacon until a request to start a wireless communication system, which has been sent from another system management apparatus, is permitted (YES in step S1103).

In step S1102, the control unit 260 then instructs the system information management unit 220 to receive a request to start the wireless communication system from another system management apparatus (the game apparatus 150).

In step S1103, the control unit 260 instructs the system information management unit 220 to determine whether the wireless communication system is started according to the request. The determination whether the system is to be started is made by a state where the display 151 operates a management function for another system or setting by the user (e.g., such setting as not to meet a request from another system management apparatus), for example. If the request from another system management apparatus is permitted (YES in step S1103), the display 151 starts processing for connection as a station to the system management apparatus.

In step S1104, the control unit 260 first instructs the AP processing unit 211 to permit connection of the system management apparatus (the game apparatus 150).

In step S1105, the control unit 260 acquires a system ID notified by the system management apparatus. If the system ID is acquired, then in step S1106, the control unit 260 instructs the STA processing unit 212 to search for a system management apparatus that notifies the acquired ID.

In step S1107, the control unit 260 determines whether the system management apparatus exists. If the system management apparatus is found out (YES in step S1107), then in step S1108, the control unit 260 instructs the notification unit 240 to notify the system management apparatus of the functions to be provided to the system. If the system management apparatus cannot be found out (NO in step S1107), connection to the system management apparatus is abandoned, to return to a state where the request to start the system has not been received.

In step S1109, the control unit 260 instructs the STA processing unit 212 to determine whether connection from the system management apparatus is permitted as a result of step S1108. If the connection is permitted (YES in step S1109), then in step S1110, the control unit 260 instructs the STA processing unit 212 to execute the remaining connection processing. Thus, the game apparatus 150 is used as a base station, and the display 151 is used as a station, to connect the game apparatus 150 and the display 151. If the connection is rejected (NO in step S1109), the connection to the system management apparatus is abandoned, to return to a state where the request to start the system has not been received.

In step S1111, the control unit 260 instructs the switching unit 213 to stop the function of the base station when the connection to the system management apparatus is completed. Thus, the connection of game apparatus 150 used as a station and the display 151 used as a base station is terminated.

Although in the present exemplary embodiment, the function of the base station is stopped at the time point where the connection to the system management apparatus is completed, the function of the base station may be stopped at an earlier stage in mounting. For example, the function of the base station may be stopped before the system management apparatus is searched for in step S1106, while being started again when the connection to the system management apparatus has failed.

Figure 12:
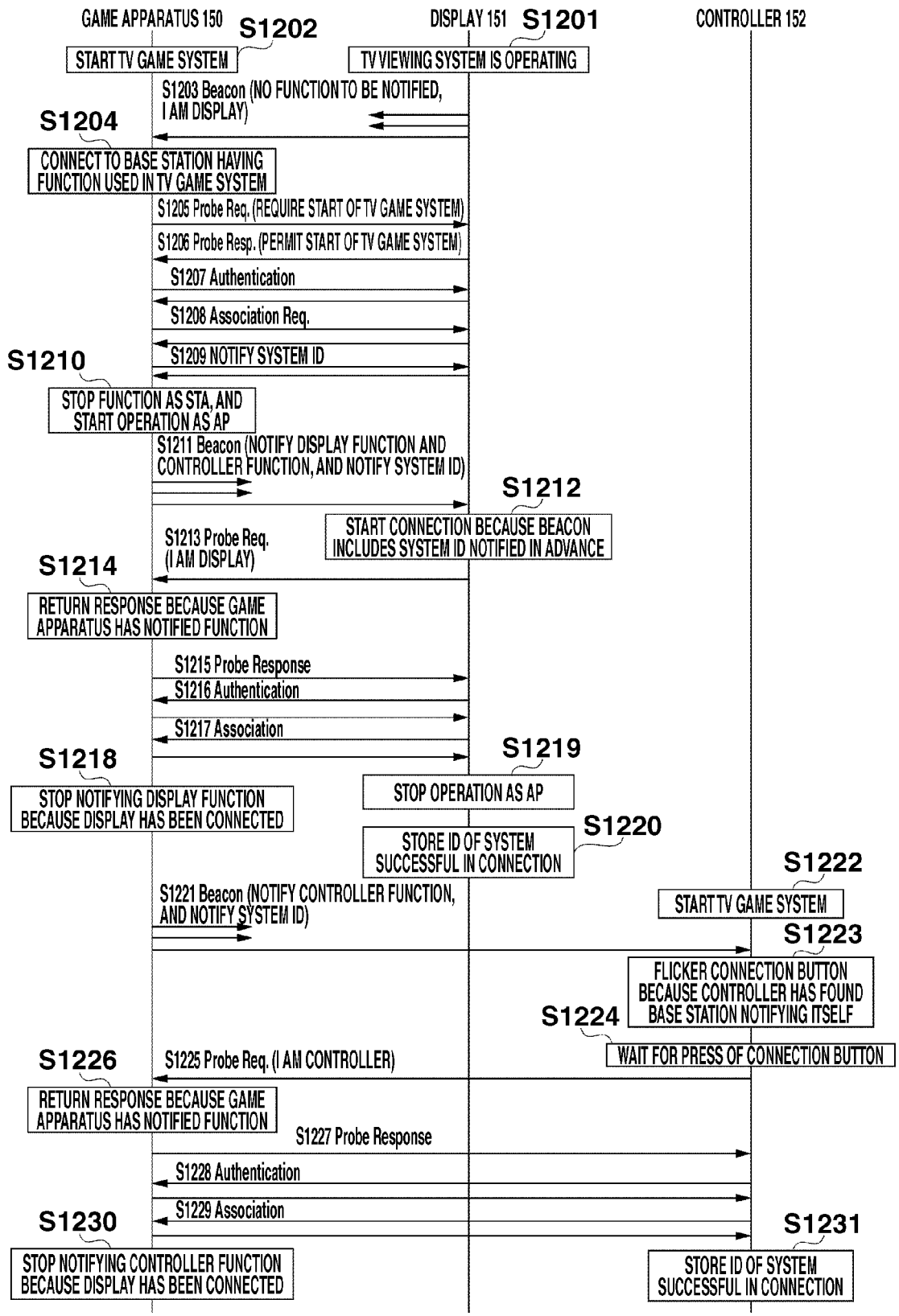
FIG. 12 is a sequence chart illustrating operations according to the exemplary embodiment of the present invention.

FIG. 12 is a sequence chart in the system configuration illustrated in FIG. 1B. FIG. 12 illustrates a case where the game apparatus 100 first establishes the TV game system. As an initial state, the game apparatus 150, the display 151, and the controller 152 have not been connected to one another yet.

The display 151 is operating as a base station. In step S1201, the display 151 is operating as a system management apparatus for a system (TV viewing system) different from the TV game system. In step S1203, the display 151 notifies the user that it has a display function using a beacon frame in this state. On the other hand, in step S1202, the TV game system is started in the game apparatus 150. The game apparatus 150 starts to search for a base station having a function included in the functions required in the TV game system.

In step S1204, the game apparatus 150 recognizes that the display 151 is a base station having a function (a display function) included in the functions required in the TV game system from the beacon frame illustrated in step S1203, to start connection to the display 151. In step S1205, the game apparatus 150 simultaneously requires the display 151 to start the TV game system. If the display 151 permits the request received in step S1205, then in step S1206, the display 151 returns a response to the game apparatus 150. Here, the request is permitted. If the request is rejected, however, the display 151 notifies the game apparatus 150 that the request has been rejected by not returning the response illustrated in step S1206 or returning a message that the request has been rejected. The determination whether the display 151 permits the request may be made by a user's operation.

If the game apparatus 150 detects that the request to start the TV game system is permitted, then in steps S1207 and S1208, processing for connection to the display 151 is executed. If the connection is completed, then in step S1209, the game apparatus 150 notifies a system ID to be notified as a system management apparatus. If the notification is completed, the game apparatus 150 stops a function as a station. In step S1210, the game apparatus 150 starts an operation as a base station. In step S1211, the game apparatus 150 notifies information relating to the functions required in the TV game system and the system ID notified in step S1209.

In step S1212, the display 151 starts the processing for connection to the game apparatus 150 because the beacon frame illustrated in step S1211 includes the system. ID notified in step S1209. In step S1213, the display 151 sends to the game apparatus 150 a connection request carrying information relating to the function provided by the display 151. In steps S1214 and S1215, the game apparatus 150 is permitted to make connection. In steps S1216 and S1217, the remaining connection processing is executed. If the connection is completed, then in step S1218, the game apparatus 150 stops notifying the display function. In step S1219, the display 151 stops an operation as a base station. In step S1220, the display 151 stores the notified system ID as an ID of a system successful in connection (as a wireless terminal).

The controller 152 is connected to the game apparatus 150 in operations (steps S1221 to S1231) similar to the operations (steps S602 to S618) in the first exemplary embodiment illustrated in FIG. 6 and hence, the description thereof is not repeated.

According to the third exemplary embodiment, the function of the base station is transferred from a first communication apparatus to a second communication apparatus serving as a system management apparatus, to eliminate the need to replace various types of information (e.g., functional information required in the system) between the base station and the system management apparatus. Therefore, a load applied to the communication apparatus or the user can be reduced.

FIG. 1A also illustrates the configuration of a wireless communication system according to a fourth exemplary embodiment of the present invention. The wireless communication system is a TV game system as an example, and is established by connecting communication apparatuses to one another using a wireless LAN conforming to IEEE 802.11 series. In the present exemplary embodiment, a game apparatus 100 operates as a base station and a system management apparatus. An AP 110 operates as a base station not associated with the TV game system. A display 120 and a controller 130 respectively operate as stations (apparatuses to be controlled) of the wireless LAN. The hardware configuration of each of the communication apparatuses is similar to that in the first exemplary embodiment and hence, the description thereof is not repeated.

Figure 13:
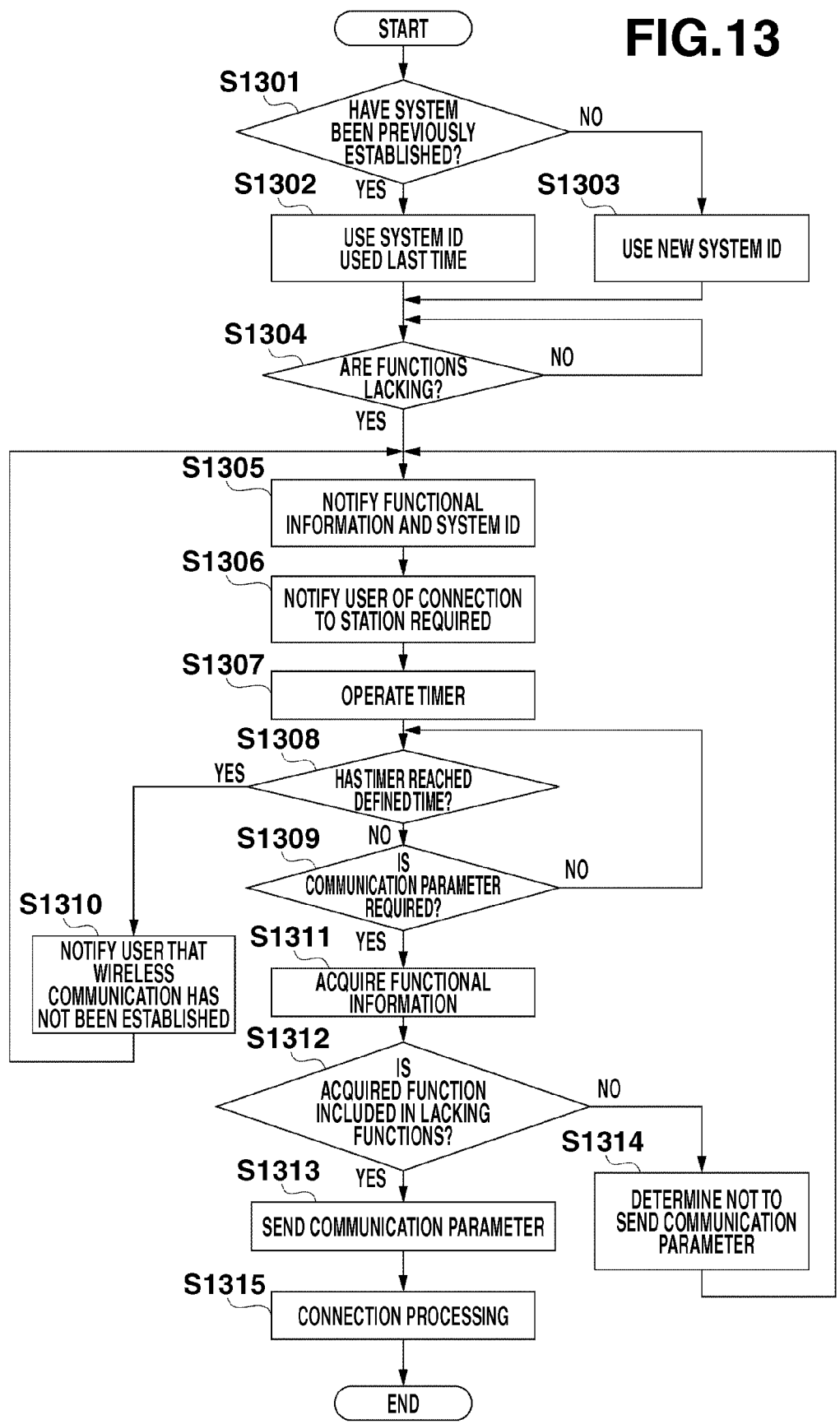
FIG. 13 is a flowchart illustrating operations executed by a game apparatus according to the exemplary embodiment of the present invention.

FIG. 13 is a flowchart illustrating operations for a control unit 260 in the game apparatus 100 to read out and execute a program stored in a storage unit 270. This processing is started when a user performs an operation for the game apparatus 100 to start to establish the TV game system. Alternatively, the processing may be started when the power to the game apparatus 100 is turned on.

In step S1301, the control unit 260 instructs a system ID management unit 221 to confirm whether the game apparatus 100 has established the TV game system as a system management apparatus before to determine a system ID to be used. If the TV game system has been established before (YES in step S1301), the processing proceeds to step S1302. If the TV game system has not been established (NO in step S1301), the processing proceeds to step S1303. Here, the TV game system has not been established before, and thus the processing proceeds to step S1303.

In step S1302, the control unit 260 instructs the system ID management unit 221 to determine that a system ID used last time is used, and then the processing proceeds to step S1304. This enables the system management apparatus to manage the same system using the same system ID, thereby making the management easy. Therefore, the processing load on the station is reduced.

In step S1303, the control unit 260 instructs the system ID management unit 221 to determine that the TV game system is newly assigned a system ID because it has not been established before, and then the processing proceeds to step S1304. Here, it is determined that the TV game system is newly assigned "1" as the system ID.

In step S1304, the control unit 260 instructs the system ID management unit 221 to determine whether functions required in the TV game system are lacking based on the required functions and functional information notified by the station connected to the game apparatus 100. If the required functions are lacking (YES in step S1304), the processing proceeds to step S1305. On the other hand, if the required functions are not lacking (the system has all the required functions) (NO in step S1304), the determination in step S1304 is repeated until the system lacks the required functions by disconnecting the station that has been connected and changing the functions required in the system, for example. Here, the game apparatus 100 recognizes that a display function and a controller function are required in the TV game system. Since there is no station connected to the game apparatus 100, it is determined that the system does not have all the required functions, and then the processing proceeds to step S1305.

In step S1305, the control unit 260 instructs a notification unit 240 to notify information relating to the lacking function and the system ID, and then the processing proceeds to step S1306. Here, the game apparatus 100 notifies that the display function and the controller function are lacking and the system ID is "1" using the beacon. The game apparatus 100 continues the notification using the beacon until it is determined that the station has required a parameter for wireless communication conforming to IEEE 802.11 series in step S1309.

If the functions required in the system are thus lacking, the base station notifies information relating to the lacking function. This enables the station to recognize the functions required by the base station, thereby enabling the station to determine before connection whether the station is required in the system established by the base station. Therefore, the station need not perform processing for unnecessary connection and disconnection to and from the base station, so that the processing loads on the base station and the station (i.e., the communication apparatuses) can be reduced. A user of the station can know the functions required for the base station to establish the system before the station and the base station are connected to each other, so that the convenience of the user can be improved.

In step S1306, the control unit 260 instructs a user interface 250 to notify the user to make connection to the station. Here, a button (connection button) for replacing a communication parameter for wireless communication conforming to IEEE 802.11 series between the game apparatus 100 and the station is flickered.

In the present exemplary embodiment, the communication parameter includes communication parameters required to perform wireless communication such as Service Set Identifier (SSID) serving as a network identifier, an encryption system, an encryption key, an authentication method, and an authentication key. This enables the user to easily know that the connection button is to be pressed to establish the TV game system, resulting in improved convenience. Notification methods such as message display on a screen, sound, and vibration may be used in addition to the flickering of the connection button.

If the user interface 250 recognizes that the user presses the connection button, the processing proceeds to step S1307. In step S1307, the control unit 260 instructs an AP processing unit 211 to operate a timer, and then the processing proceeds to step S1308. Here, the timer is counted up from zero.

In step S1308, the control unit 260 instructs the AP processing unit 211 to determine whether the timer reaches a defined time. If the timer does not reach the defined time (NO in step S1308), the processing proceeds to step S1309. If the timer reaches the defined time (YES in step S1308), the timer is stopped, and then the processing proceeds to step S1310.

In step S1309, the control unit 260 instructs the AP processing unit 211 to determine whether a communication parameter is required from the station. If the communication parameter is required (YES in step S1309), the processing proceeds to step S1311 after stopping notifying the lacking function and stopping the timer. If the communication parameter is not required (NO in step S1309), the processing proceeds to step S1308. Here, the communication parameter is required from the controller 130, and then the processing proceeds to step S1311.

In step S1310, the control unit 260 instructs the user interface 250 to notify the user that wireless communication has not been established between the base station and the station, and then the processing proceeds to step S1305. This enables the user to easily know that wireless communication has not been established between the base station and the station, resulting in improved convenience. If the communication parameter is not required from the station in a period of time elapsed since the connection button in the game apparatus 100 was pressed until the defined time, the request of the communication parameter from the station is not received until the connection button is pressed again. This can prevent connection to a station that is not intended by the user. Therefore, the security of the system can be improved.

In step S1311, the control unit 260 instructs an acquisition unit 230 to acquire information relating to the function notified by the station. The station notifies information relating to its own function. Here, the acquisition unit 230 acquires notification that the controller 130 has a controller function.

In step S1312, the control unit 260 instructs a functional information management unit 222 to determine whether the functions lacking in the system include the function acquired in step S1311. If the acquired function is included (YES in step S1311), the processing proceeds to step S1313. If the acquired function is not included (NO in step S1311), the processing proceeds to step S1314. Here, the display function and the control function are lacking. Since the function acquired in step S1311 is the controller function, it is determined that the functions lacking in the system include the controller function.

In step S1313, the control unit 260 instructs the AP control unit 211 to transmit the communication parameter to the station, and then the processing proceeds to step S1315. Here, the AP processing unit 211 transmits the communication parameter to the controller 130.

In step S1314, the control unit 260 instructs the AP processing unit 211 to determine that the communication parameter is not sent to the station, and then the processing proceeds to step S1305. The control unit 260 may instruct the user interface 250 to notify the user that wireless communication has not been established between the base station and the station. This enables the user to easily know that wireless communication has not been established between the base station and the station, resulting in improved convenience. Since the communication parameter is not sent to a station not required in establishing the system, the processing loads on the base station and the station (i.e., the communication apparatuses) are reduced. Further, the security of the system is improved.

In step S1315, the control unit 260 instructs the AP processing unit 211 to perform processing for connection to the station in response to a connection request from the station that has sent the communication parameter, and then the processing proceeds to step S1304. The connection processing is performed using the sent communication parameter. Here, the game apparatus 100 performs the connection processing in response to the connection request from the controller 130. Further, the control unit 260 instructs the user interface 250 to notify the user that wireless communication has been established between the base station and the station. This enables the user to easily know that wireless communication has been established between the base station and the station, resulting in improved convenience.

As described above, the base station notifies the information relating to the functions lacking in the system, and sends the communication parameter to the station having the lacking function. The base station does not send the communication parameter to a station not required in the system. Thus, the security of the system is improved. Further, the processing load on the communication apparatus is reduced. If the functions required in the system are lacking, the user is urged to make connection to the station, so that the convenience of the user is improved.

FIG. 14 is a flowchart illustrating operations for a control unit 360 in the controller 130 to readout and execute the program stored in a storage unit 370. This processing is started when the power to the controller 130 is turned on.

In step S1401, the control unit 360 instructs an STA processing unit 311 to search for the base station that sends out a beacon. If the base station that sends out the beacon is found out, the processing proceeds to step S1402. Here, the controller 130 finds out the game apparatus 100.

In step S1402, the control unit 360 instructs an acquisition unit 330 to acquire functional information and a system ID that are notified by the base station, and then the processing proceeds to step S1403. Here, the display function and the controller function are acquired as the functional information from the game apparatus 100, and "1" is acquired as the system ID.

In step S1403, the control unit 360 instructs a functional information management unit 322 to determine whether the notified functional information includes the function of the controller 130. If the function of the controller 130 is included (YES in step S1403), the processing proceeds to step S1401. If the function of the controller 130 is not included (NO in step S1403), the processing proceeds to step S1404. Here, it is determined that the function of the controller 130 is included, and then the processing proceeds to step S1404. If the station does not thus have a function included in the functions required in the system, the station is not connected to the base station. Therefore, the station need not perform processing for unnecessary connection and disconnection to and from the base station in establishing the system, so that the processing load on the station can be reduced.

In step S1404, the control unit 360 instructs a system information management unit 320 to determine whether the controller 130 has previously been connected to the base station to establish a system identified by the acquired system ID. If the controller 130 has been connected to the base station (YES in step S1404), the processing proceeds to step S1410. If the controller 130 has not been connected to the base station (NO in step S1404), the processing proceeds to step S1405. Here, the controller 130 has not been connected to the game apparatus 100 to establish a system identified by the system ID "1", and then the processing proceeds to step S1405.

In step S1405, the control unit 360 instructs a user interface 350 to notify the user that candidates for connection destinations exist. The notification may be made by flickering of a button (connection button) for replacing a communication parameter for wireless communication conforming to IEEE 802.11 series between the controller 130 and the base station, message display on a screen, sound, vibration, or the like.

Thus, the station having a function included in the functions required in the system makes notification for urging the user to make connection to the base station. Therefore, the user can easily specify the station having the function included in the functions required in the system, so that the convenience of the user is improved.

If the user interface 250 recognizes that the user has pressed the connection button, the processing proceeds to step S1406. When the controller 130 is first connected to the base station for the system to be established, connection to a base station that is not intended by the user can be prevented by requiring a user's operation, so that the security of the system is improved.

In step S1406, the control unit 360 instructs a notification unit 340 to require the base station to send the communication parameter while notifying the base station of the function of the controller 130, and then the processing proceeds to step S1407. Here, the notification unit 340 requires the base station to send the communication parameter while notifying the game apparatus 100 that the controller 130 has a controller function.

In step S1407, the control unit 360 instructs an STA processing unit 311 to determine whether the communication parameter is acquired from the base station as processing for accommodating the controller 130 in a network. If the communication parameter is acquired (YES in step S1407), the processing proceeds to step S1408. If the communication parameter cannot be acquired (NO in step S1407), the processing proceeds to step S1409. A case where the communication parameter cannot be acquired includes a case where it is determined that the base station does not send the communication parameter and a case where a communication error occurs between the controller 130 and the base station. Here, the STA processing unit 311 acquires the communication parameter from the game apparatus 100, and then the processing proceeds to step S1408.

In step S1408, the control unit 360 instructs the STA processing unit 311 to perform processing for connection to the base station using the communication parameter acquired from the base station, and then the processing proceeds to step S1412. Here, processing for connection to the game apparatus 100 is performed using the acquired communication parameter, and then the processing proceeds to step S1412.

In step S1409, the control unit 360 instructs the user interface 350 to notify the user that the connection to the base station has failed, and then the processing proceeds to step S1401.

In step S1410, the control unit 360 instructs the notification unit 340 to notify the base station of the function of the controller 130, and then the processing proceeds to step S1411. Here, the game apparatus 100 is notified that the controller 130 has a controller function.

Thus, the communication parameter is not required of the base station that has been connected once. The reason for this is that the communication parameter for performing wireless communication to the base station that has been connected once is not required because it has already been acquired. Therefore, the processing loads on the station and the base station (i.e., the communication apparatuses) are reduced.

In step S1411, the control unit 360 instructs the STA processing unit 311 to perform processing for connection to the base station using the communication parameter already acquired, and then the processing proceeds to step S1412.

In step S1412, the control unit 360 instructs the user interface 350 to notify the user that the connection to the base station is completed. Here, the user is notified that the connection to the game apparatus 100 is completed by turning the connection button on. If the connection processing is thus completed, the user is notified that the connection processing is completed. Therefore, the user can easily know that the connection is completed, so that the convenience of the user is improved.

As described above, the station requires the communication parameter of the base station that requires its own function, and is connected to the base station using the communication parameter. Thus, the station is not connected to the base station that does not require its own function. Therefore, the processing loads on the base station and the station are reduced. The communication parameter is not required of the base station that has been connected once. Therefore, the processing loads on the station and the base station are reduced. The station is connected to the base station that has been connected once without an instruction from the user, so that the convenience of the user is improved.

According to the above-mentioned exemplary embodiment, the functional information and the system ID are sent using the beacon. However, the present invention is not limited to this. The functional information and the system ID can be sent by other methods. For example, a response frame for search may include functional information, and a unique frame may be used to make notification. Although functions lacking in the system are also notified in functional information to be notified, the lacking function, including other functions, may be notified. In a state where the display is connected in the TV game system according to the exemplary embodiment, for example, the notification of a display function may be continued to permit connection of a display having higher performance.

The communication apparatus may simultaneously have a plurality of functions. For example, the communication apparatus provides a game function when a game apparatus operates as a system management apparatus, while functioning as a digital versatile disc (DVD) player when the game apparatus does not operate as a system management apparatus.

The above-mentioned processing may be implemented by a program installed in a computer. This program can be not only provided by a communication unit such as a network but also provided after being stored in a storage medium such as a compact disc read-only memory (CD-ROM).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-118969 filed May 15, 2009, which is hereby incorporated by reference herein in its entirety.

What is claimed is:

1. A communication apparatus to operate a predetermined system function with a plurality of other communication apparatuses, the communication apparatus comprising:
    a determination unit configured to determine a missing function in order to operate the predetermined system function according to information on a function necessary for the predetermined system function to be operated by the communication apparatus together with the plurality of other communication apparatuses and information on a function provided by a first other communication apparatus wirelessly connected to the communication apparatus;
    a first sending unit configured to send information to a second other communication apparatus having the missing function determined by the determination unit in a network; and
    an execution unit configured to execute processing for connecting the second other communication apparatus wirelessly according to a request from the second other communication apparatus.

2. The communication apparatus according to claim 1, wherein the first sending unit is configured to send information on the missing function determined by the determination unit.

3. The communication apparatus according to claim 2, further comprising:
    an acquisition unit configured to acquire a function of the second other communication apparatus; and
    a change unit configured to change the missing function information to be sent by the sending unit in accordance with the function acquired by the acquisition unit.

4. The communication apparatus according to claim 1, wherein the processing for connecting the second other communication apparatus includes processing for transmitting, to the second other communication apparatus, a communication parameter for connecting to the communication apparatus.

5. The communication apparatus according to claim 1, further comprising a second sending unit configured to send a signal to wirelessly connect the first other communication apparatus and the second other communication apparatus to the communication apparatus to operate the predetermined system function.

6. The communication apparatus according to claim 5, wherein the determination unit is configured to determine a missing function according to the information on the function necessary for the predetermined system function to be operated by the communication apparatus together with the plurality of other communication apparatuses and the information on the function provided by the first other communication apparatus wirelessly connected to the communication apparatus according to the signal sent by the second sending unit.

7. The communication apparatus according to claim 1, wherein the first sending unit sends the information using a beacon.

8. The communication apparatus according to claim 1, wherein the execution unit configured to execute processing for connecting the second other communication apparatus complied with IEEE 802.11 series standard.

9. A method for controlling a communication apparatus to operate a predetermined system function with a plurality of other communication apparatuses, the method comprising:
    determining a missing function in order to operate the predetermined system function according to information on a function necessary for the predetermined system function to be operated by the communication apparatus together with the plurality of other communication apparatuses and information on a function provided by a first other communication apparatus wirelessly connected to the communication apparatus;
    sending information to a second other communication apparatus having the missing function determined by the determining step in a network; and
    executing processing for connecting the second other communication apparatus wirelessly according to a request from the second other communication apparatus.

10. The method for controlling a communication apparatus according to claim 9, wherein the sending step sends information on the missing function determined by the determining step.

11. The method for controlling a communication apparatus according to claim 10, further comprising:
    acquiring a function of the second other communication apparatus; and
    changing the missing function information to be sent by the sending step in accordance with the function acquired by the acquiring step.

12. The method for controlling a communication apparatus according to claim 9, wherein the processing for connecting the second other communication apparatus includes processing for transmitting, to the second other communication apparatus, a communication parameter for connecting to the communication apparatus.

13. The method for controlling a communication apparatus according to claim 9, wherein the sending step sends a signal to wirelessly connect the first other communication apparatus and the second other communication apparatus to the communication apparatus to operate the predetermined system function.

14. The method for controlling a communication apparatus according to claim 13, wherein the determining step determines a missing function according to the information on the function necessary for the predetermined system function to be operated by the communication apparatus together with the plurality of other communication apparatuses and the information on the function provided by the first other communication apparatus wirelessly connected to the communication apparatus according to the signal sent by the sending step.

15. The method for controlling a communication apparatus according to claim 9, wherein the sending step sends the information using a beacon.

16. The method for controlling a communication apparatus according to claim 9, wherein the executing step executes processing for connecting the second other communication apparatus complied with IEEE 802.11 series standard.

17. A non-transitory computer-readable storage medium storing a computer program having computer-executable instructions for causing a computer to execute the method according to claim 9.

18. A communication apparatus comprising:
a connection unit configured to wirelessly connect to a first other communication apparatus;
a determination unit configured to determine a lacking function in order to operate a predetermined system based on information about a function of the first other communication apparatus to which the connection unit connects to;
a sending unit configured to send predetermined information to a second other communication apparatus having the determined function; and
an execution unit configured to execute processing for wirelessly connecting to the second other communication apparatus according to a request from the second other communication apparatus.

19. The communication apparatus according to claim 18, wherein the sending unit is configured to send the predetermined information to the second other communication apparatus based on information about the function of the first other communication apparatus to which the connection unit connects to.

20. The communication apparatus according to claim 19, wherein the predetermined information includes information about the determined function.

21. The communication apparatus according to claim 19, wherein the processing to be executed by the execution unit includes sending a communication parameter for connecting to the communication apparatus to the second other communication apparatus.

22. The communication apparatus according to claim 19, wherein the processing to be executed by the execution unit includes wireless communication conforming to IEEE 802.11 series with the second other communication apparatus.

23. A method for controlling a communication apparatus to operate a predetermined system function with a plurality of other communication apparatuses, the method comprising:
wirelessly connecting to a first other communication apparatus;
determining a lacking function in order to operate a predetermined system based on information about a function of the first other communication apparatus;
sending predetermined information to a second other communication apparatus having the determined function; and
executing processing for wirelessly connecting to the second other communication apparatus according to a request from the second other communication apparatus.

24. A non-transitory computer-readable storage medium storing a computer program having computer-executable instructions for causing a computer to execute a method comprising:
wirelessly connecting to a first other communication apparatus;
determining a lacking function in order to operate a predetermined system based on information about a function of the first other communication apparatus;
sending predetermined information to a second other communication apparatus having the determined function; and
executing processing for wirelessly connecting to the second other communication apparatus according to a request from the second other communication apparatus.

* * * * *